US009952768B2

(12) United States Patent
Crawford et al.

(10) Patent No.: US 9,952,768 B2
(45) Date of Patent: Apr. 24, 2018

(54) MULTIPLE MODE DATA STRUCTURES FOR REPRESENTATION OF MULTIPLE SYSTEM COMPONENTS IN A STORAGE MANAGEMENT SYSTEM

(71) Applicant: INTERNATIONAL BUSINESS MACHINES CORPORATION, Armonk, NY (US)

(72) Inventors: Joshua J. Crawford, Tucson, AZ (US);
Paul A. Jennas, II, Tucson, AZ (US);
Jason L. Peipelman, Austin, TX (US);
Matthew J. Ward, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 80 days.

(21) Appl. No.: 14/887,221

(22) Filed: Oct. 19, 2015

(65) Prior Publication Data

US 2017/0109052 A1    Apr. 20, 2017

(51) Int. Cl.
*G06F 3/00* (2006.01)
*G06F 3/06* (2006.01)

(52) U.S. Cl.
CPC .......... *G06F 3/0605* (2013.01); *G06F 3/0629* (2013.01); *G06F 3/0683* (2013.01); *G06F 3/0658* (2013.01)

(58) Field of Classification Search
CPC .... G06F 3/0605; G06F 3/0629; G06F 3/0658; G06F 3/0683
USPC ........ 711/154, 163, 170; 707/785, 791, 802; 709/218, 225, 229; 710/10, 17, 28, 37
See application file for complete search history.

(56) References Cited

U.S. PATENT DOCUMENTS

| 8,244,850 | B1 | 8/2012 | Roussos et al. | |
|---|---|---|---|---|
| 8,489,744 | B2 | 7/2013 | Elyashev et al. | |
| 2006/0106808 | A1* | 5/2006 | Kalos | G06F 13/387 |
| 2006/0123157 | A1* | 6/2006 | Kalos | G06F 3/0605 |
| | | | | 710/36 |
| 2008/0270461 | A1* | 10/2008 | Gordon | G06F 3/0608 |

(Continued)

OTHER PUBLICATIONS

A. Westphal, et al, "IBM System Storage DS8000: Architecture and Implementation", IBM Corporation, Nov. 2012, pp. 534.

(Continued)

*Primary Examiner* — Reba I Elmore
(74) *Attorney, Agent, or Firm* — William K. Konrad; Konrad Raynes Davda & Victor LLP

(57) ABSTRACT

In one aspect, a multiple mode data structure can be utilized by a storage management system to provide a host representation role in one mode, and represent both a host and a host port in another mode. In one embodiment, in a first mode, the data structure has an undefined host port name attribute and a defined host name attribute to represent a host identified by the defined host name attribute. In the first mode, the data structure is restricted from representing a host port in the storage management system when the host port name attribute is undefined. In a second, unrestricted mode, the multiple mode data structure can represent both a host as well as a host port when a host port name attribute is defined. In one embodiment, the multiple mode data structure can also represent a host cluster. Other aspects are described.

27 Claims, 17 Drawing Sheets

(56) References Cited

U.S. PATENT DOCUMENTS

2013/0055071 A1* 2/2013 Bray .................. G06F 17/3089
715/234
2015/0039815 A1 2/2015 Klein
2015/0058291 A1 5/2015 Earl et al.

OTHER PUBLICATIONS

"Creating SCSI Host Port Connections Using DS CLI", IBM Corporation, pp. 2, [onine][retrieved Aug. 4, 2015] http://www-01.ibm/support/knowledgecenter/api/content/nl/en-us/HW2B2/com.ibm.storage.ssic.help.doc/f2c_clicrtngscsihost_25ekre.html.
Attribute (computing), Wikipedia, [online][retrieved Sep. 23, 2015] pp. 3, http://en.wikipedia.org/wiki/Attribute_(computing).
Class-based programming, Wikipedia, [online][retrieved Sep. 23, 2015] pp. 3, http://en.wikipedia.org/wiki/Class-based_programming.
Object (computer science), Wikipedia, [online][retrieved Sep. 23, 2015] pp. 5, http://en.wikipedia.org/wiki/Object_(computer_science).

* cited by examiner

MULTIPLE MODE DATA STRUCTURES FOR REPRESENTATION OF MULTIPLE SYSTEM COMPONENTS IN A STORAGE MANAGEMENT SYSTEM

BACKGROUND OF THE INVENTION

1. Field of the Invention

The present invention relates to a computer program product, system, and method having data structures for system component management in a storage management system.

2. Description of the Related Art

In a storage environment, a storage controller also often referred to as a server, typically receives input/output (I/O) instructions from a host to write data to or read data from data storage units controlled by the storage controller. The hosts and the storage controller frequently communicate with each other through host ports through which signal paths between the various hosts and the storage controller pass. A connection fabric often provides the connections between the hosts and the host ports. The connections of the connection fabric may be configurable by appropriate settings of switches or other devices to connect specific hosts to specific host ports. Other types of connection fabrics may have fixed paths to connect specific hosts to specific host ports.

The data is frequently stored in the storage units in units of data often referred to as a "storage volume." Each storage volume is typically assigned one or more host ports. The assignments of specific storage volumes to specific host posts may be represented by a volume to host port mapping. The mapping of a storage volume to a host port permits data read from that volume to be transferred through the host port to which it is mapped. If a host is assigned to a host port which is mapped to the storage volume, the host may receive the read data through the host port mapped to the storage volume. Conversely, the mapping of a storage volume to a host port permits write data from a host assigned to a host port which is mapped to the storage volume, to be transferred through the host port to which the storage volume is mapped.

A storage controller is typically configured and administered by a user through a storage management system operating on the storage controller. Such management systems typically includes a user interface such as a graphical user interface (GUI) which facilitates such configuration and administration. In one type of such management system, the management system maintains in a database system configuration data identifying which storage volume (or groups of storage volumes) are mapped to a particular host port, but often do not maintain system configuration data identifying which storage volume or host port is connected to which host. Other types of management systems for storage controllers maintain both types of system configuration data, not only system configuration data identifying which storage volume (or groups of storage volumes) is mapped to a particular host port, but are also capable of maintaining system configuration data identifying which storage volume or host port is connected to which host. Accordingly, management system data structures for storing the system configuration data of the earlier generation management system may not be compatible with the requirements of a later generation management system for storing system configuration data. One approach is to add new classes of additional data structures to support the added system configuration data of the later generation storage management systems.

SUMMARY

In one aspect of the present description, multiple mode data structures are provided in which each multiple mode data structure may be configured to be used by a storage management system in one of a first mode and a second mode. Each multiple mode data structure is configured to store attribute data including a host port name attribute for defining the name of a host port to be represented by the multiple mode data structure and including a host name attribute of a host for defining the name of a host to be represented by the multiple mode data structure wherein a host port represented by a multiple mode data structure is assigned to the host represented by the same multiple mode data structure. A multiple mode data structure in accordance with the present description may be used in a first, restricted mode, having an undefined host port name attribute and a defined host name attribute, to represent a first host identified by the defined host name attribute of the first multiple mode data structure in the first mode. Similarly, a multiple mode data structure in accordance with the present description may be used in a first, restricted mode, having an undefined host port name attribute and a defined host cluster name attribute, to represent a first host cluster identified by the defined host cluster name attribute of the first multiple mode data structure in the first mode.

In another aspect, each multiple mode data structure is further configured to store a mode attribute to indicate when defined, the mode of use of the multiple mode data structure by the storage management system. In one embodiment, in the first, restricted use mode, the use of the multiple mode data structure is restricted in response to the mode attribute being defined to indicate the first mode, so that the multiple mode data structure is restricted from representing a host port in the storage management system when the host port name attribute is undefined.

In still another aspect, in the second mode, the use of the multiple mode data structure in the second mode is unrestricted in response to the mode attribute being defined to indicate the second mode, so that the multiple mode data structure is permitted to represent a host port in the storage management system when the host port name attribute is defined. Other aspects are described.

BRIEF DESCRIPTION OF THE DRAWINGS

FIG. 1b illustrates an embodiment of a system component management of the storage management system of FIG. 1a.

FIGS. 3a-3d depict various embodiments of operations of the system component management of the storage management system of FIG. 1a.

FIGS. 4a-4d depict various embodiments of Graphic User Interface (GUI) pages for inputting system configuration data to populate data structures of the system component management of the storage management system of FIG. 1a.

FIGS. 5a-5e depict various embodiments of multiple mode system configuration data structures of the system component management of the storage management system of FIG. 1a.

FIGS. 6a-6c depict various embodiments of volume group system configuration data structures of the system component management of the storage management system of FIG. 1a.

DETAILED DESCRIPTION

Figure 1A:
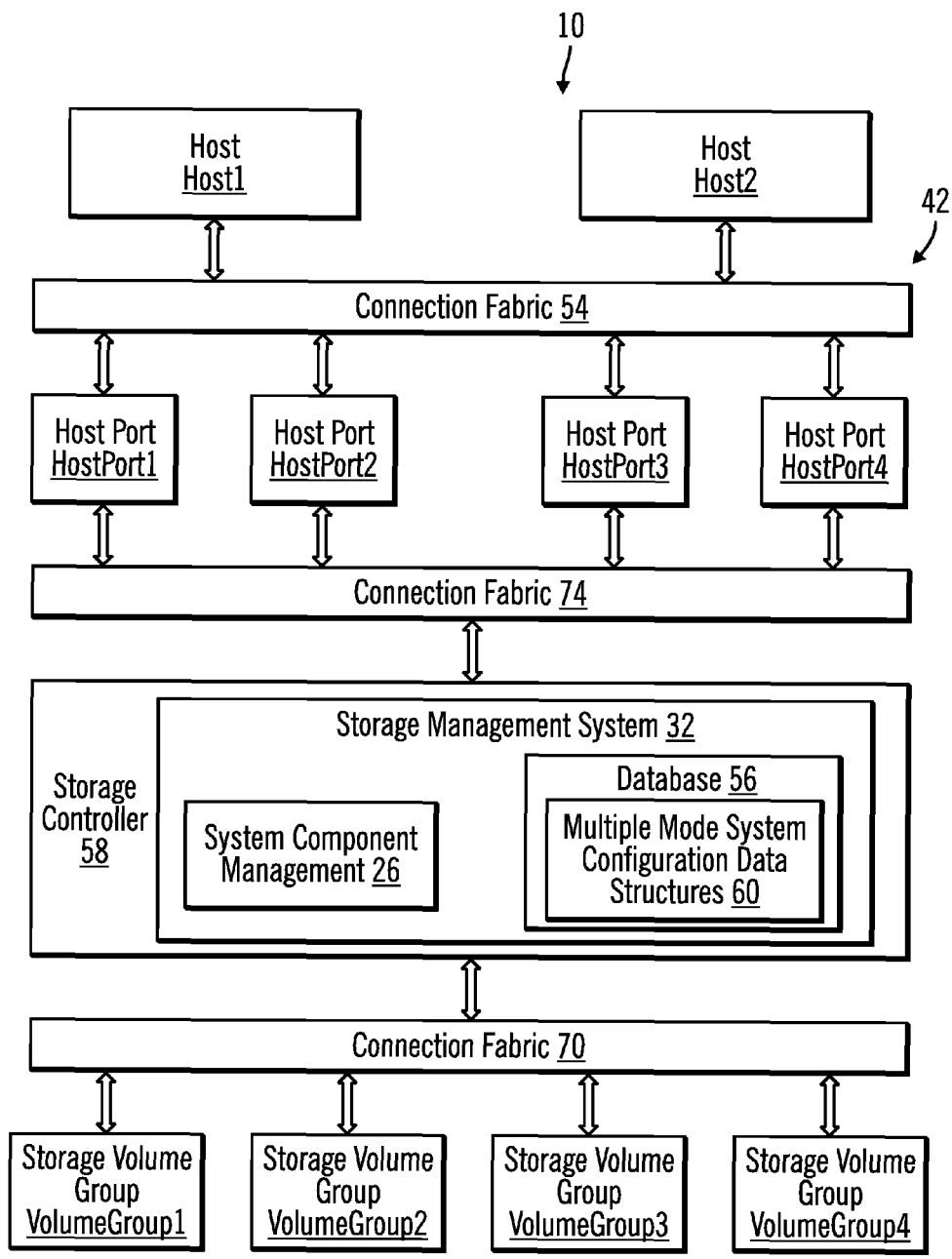
FIG. 1a illustrates an embodiment of a computing system having a storage management system employing multiple mode data structures in accordance with the present description.

As noted above, management system data structures for storing the system configuration data of an earlier generation management system may not be compatible with the requirements of a later generation management system for storing system configuration data. One approach is to add additional classes of data structures to support the added system configuration data of the later generation storage management systems. However, it is appreciated herein that adding new classes of data structures can substantially increase the burden of revising existing programming to provide features of later generation storage management systems.

One aspect of the present description provides multiple mode data structures which are fully compatible with a later generation storage management system. Moreover, the multiple mode data structures in accordance with the present description, may increase the efficiency of modifying existing programming to support features of the later generation storage management system. For example, a multiple mode data structure in accordance with the present description can be utilized to provide a host representation role in one mode, and represent both a host and a host port in another mode. Although the multiple mode host port data structures are fully compatible with a later generation storage management system, the multiple mode host port data structures of the present description may increase amount of existing programming code suitable for adaptation to the later generation storage management system, while reducing the amount of revisions to existing programming code for adaptation to the later generation of storage management system.

As explained in greater detail below, each multiple mode data structure is configured to be used by the storage management system in one of a first mode and a second mode. In a first mode, the multiple mode data structure has an undefined host port name attribute and a defined host name attribute (or host cluster name attribute) to represent a host (or host cluster) identified by the defined host (or host cluster) name attribute. In addition, in the first mode, the multiple mode data structure is restricted from representing a host port in the storage management system when the host port name attribute is undefined.

In the second mode, the multiple mode data structure is permitted to represent a host port in the storage management system when the host port name attribute is defined. In one embodiment, the multiple mode data structure has a mode attribute which when defined, indicates whether the multiple mode data structure is to be used by the storage management system in the first mode or in the second mode. It is believed that a multiple mode data structure in accordance with the present description can facilitate modifying programming code original written to support an earlier generation storage management system, to support a later generation storage management system having a wider array of system configuration data. Other aspects may be realized, depending upon the particular application.

Figure 1B:
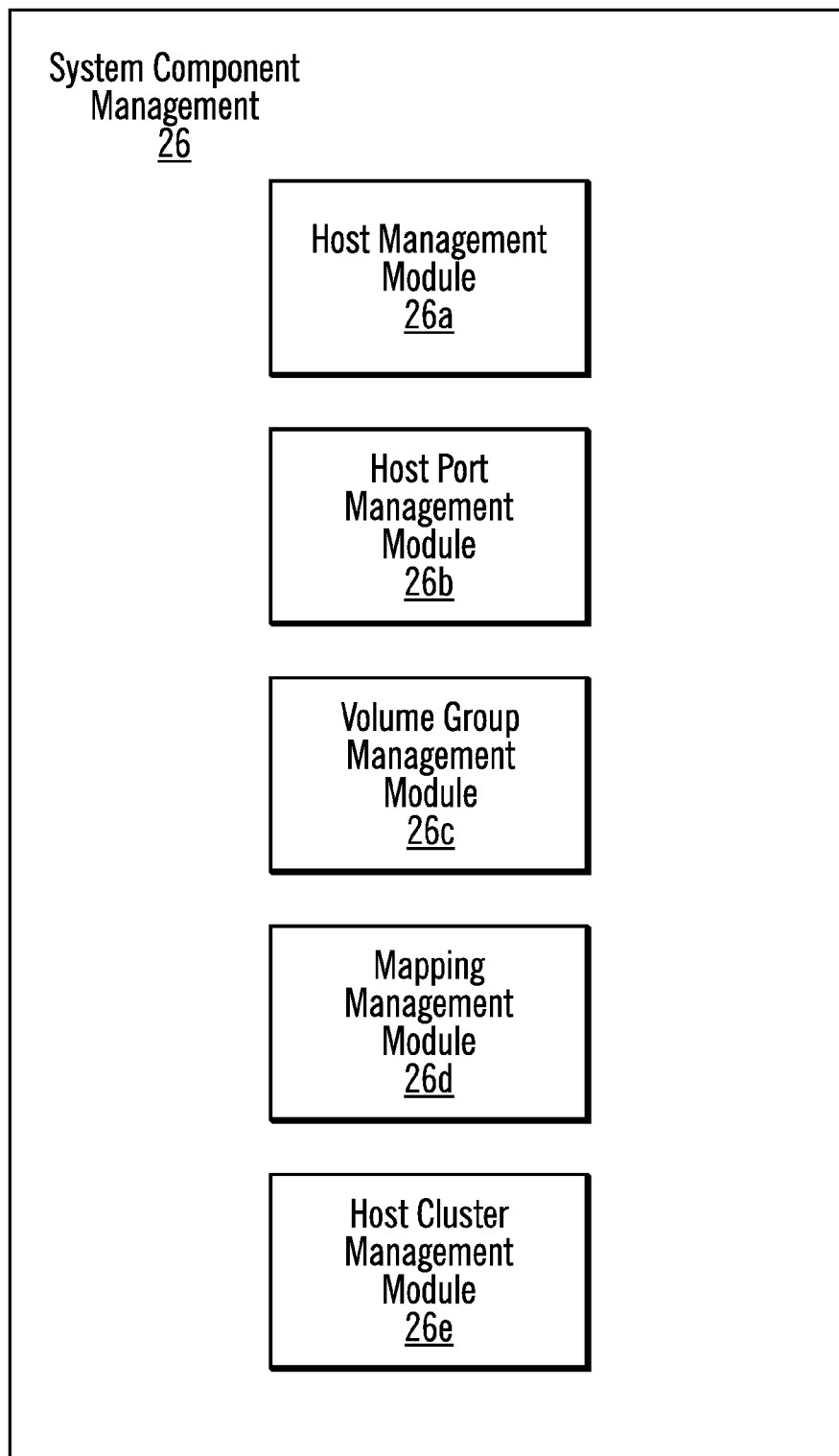

FIG. 1a illustrates one embodiment of a storage environment 10 employing system component management 26 using multiple mode data structures in a storage management system management 32 in accordance with the present description. As explained in greater detail below, data structures may be used to store system configuration data to represent system components including hosts, host clusters, host ports, storage volumes and storage volume groups, and mappings therebetween. As shown in FIG. 1b, the system component management 26 includes various system component modules including a host management module 26a for managing creation, deletion and editing of representations of hosts, a host port management module 26b for managing creation, deletion and editing of representations of host ports, a volume group management module 26c for managing creation, deletion and editing of representations of volume groups, a mapping management module 26d for managing creation, deletion and editing of mappings, and a host cluster management module 26e for managing creation, deletion and editing of representations of host clusters. It is appreciated that in other embodiments, the system component management may have other modules in addition to or instead of those depicted.

The environment 10 (FIG. 1a) includes a server 42 and a plurality of hosts as represented by the hosts, host1, host2, etc. Although the drawing of FIG. 1a depicts two such hosts for simplicity sake, it is appreciated that a storage environment may have a fewer or greater number of hosts, depending upon the particular application.

The server 42 may comprise a modified version of an enterprise storage controller/server suitable for managing access to attached storage devices, such as, but not limited to, the International Business Machine Corporation's ("IBM") DS8000® storage system or other vendor storage servers known in the art. (DS8000 is a registered trademark of IBM in countries throughout the world). The server 12 is modified to provide a storage management system employing a management interface in accordance with the present description.

A connection fabric 54 interconnects specific hosts to specific host ports, hostport1, hostport2, hostport3, hostport4, etc., of the server 42, which have been assigned to the specific hosts, Thus, host ports hostport1 and hostport2 may be assigned to host1 and host ports hostport3 and hostport4 may be assigned to host2, for example. The connection fabric 54 includes various connection devices for connecting each host port to its assigned host so that there is a signal path connecting a host port to its assigned host. Such connection devices may include cables including wire or fiber optic cables, switches, wireless transmitters and receivers, busses, networks, routers etc., depending upon the particular application. A signal path between a host port and its assigned host is typically achieved by configuring appropriate connection devices. Such configuration may be done physically or through appropriate software, depending upon the particular application. It is appreciated that a host may be assigned to more than one host port and in some applications, a host port may be assigned to more than one host. One example of a host port is a Small Computer System Interface (SCSI) host port. It is appreciated that other types of host ports may be utilized, depending upon the particular application.

The server 42 includes a storage controller 58 which controls one or more data storage units such as disk drives, tape storage, solid state memory, etc., a As explained in greater detail below, the storage controller 58 includes the storage management system 32 employing an embodiment of system component management 26 in accordance with the present description. The storage management system 32 provides for configuring and administering the storage controller 58 and the storage volumes volumegroup1-volumegroup4. The storage management system 32 maintains a database 56 which includes data structures including multiple mode data structures 60 which store system configuration data obtained through an interface of the system component management 26 mapping storage volumes, groups of storage volumes, host ports, hosts and host clusters.

Data is stored within a data storage unit as units of data which may be storage volumes, for example. Storage volumes may be grouped and managed together in a storage volume group. Other examples of units of data stored within a data storage unit are tracks, cylinders, allocation units, extents, etc. Such data units are represented in FIG. 1a as storage volumes groups which in this example are storage volume groups, storage volumegroup1, storage volumegroup2, storage volumegroup3, storage volumegroup4, etc. Although the storage environment of FIG. 1a is depicted as including four such storage volume groups for simplicity, it is appreciated that a storage environment may have more or fewer such data units, depending upon the particular application. Moreover, although the data units are depicted as storage volume groups, it is appreciated that other types of data units may be utilized in a system component management in accordance with the present description.

A connection fabric 70 interconnects storage controller 58 to the storage volume groups, storage volumegroup1-volumegroup4 of the data storage units. Similarly, a connection fabric 74 interconnects storage controller 58 to the host ports hostport1-hostport4 so that there are signal paths connecting the storage controller to each of the host ports hostport1-hostport4. The connection fabric 70, like the connection fabric 54 includes various connection devices for connecting the storage controller to each storage volume group, storage volumegroup1-volumegroup4. Similarly, the connection fabric 74 includes various connection devices for connecting the storage controller to each host port hostport1-hostport4 so that there are signal paths connecting the storage controller to each host port hostport1-hostport4. Such connection devices again, may include cables including wire or fiber optic cables, switches, wireless transmitters and receivers, busses, networks, routers etc., depending upon the particular application. A signal path between the storage controller and a host port or storage volume is typically achieved by configuring appropriate connection devices. Such configuration may be done physically or through appropriate software, depending upon the particular application.

One or more of the connection fabrics 54, 70, 74 may comprise a Storage Area Network (SAN), Local Area Network (LAN), Intranet, the Internet, Wide Area Network (WAN), peer-to-peer network, wireless network, arbitrated loop network, etc. The storage volumes are stored in storage units which may each be implemented in one or more storage devices, or an array of storage devices configured as Just a Bunch of Disks (JBOD), Direct Access Storage Device (DASD), Redundant Array of Independent Disks (RAID) array, virtualization device, tape storage, flash memory, etc. The storage devices may comprise hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random-access memory (RRAM), spin transfer torque memory (STM-RAM), conductive bridging RAM (CBRAM), magnetic hard disk drive, optical disk, tape, etc. Although a certain number of instances of elements, are shown, there may be any number of these components.

As previously mentioned, storage management systems frequently maintain system configuration data identifying which storage component such as a storage volume (or groups of storage volumes) is mapped to which system component, such as a host or host port, for example. In the embodiment of FIG. 1a, system configuration data identifying mappings of a storage volume (or groups of storage volumes) to hosts, host clusters and host ports may be maintained in the database 56 maintained by the storage management system 32.

Figure 2A:
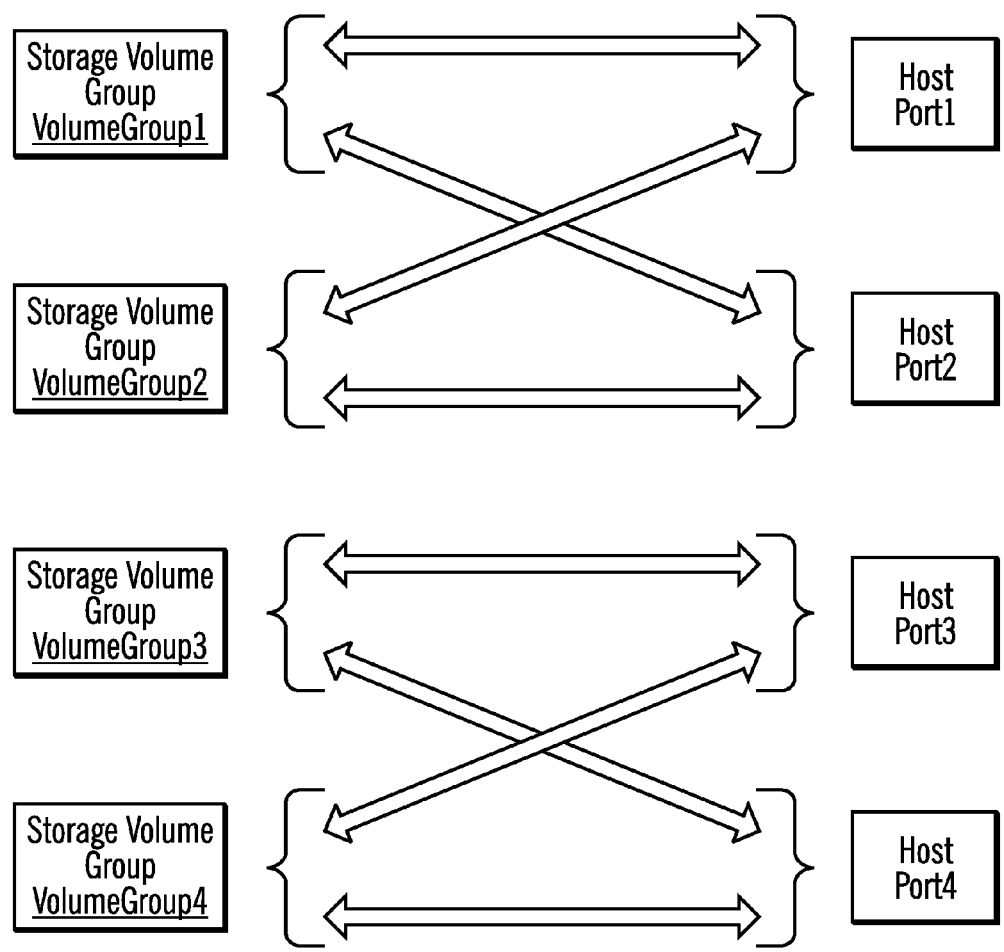
FIG. 2a is a graphical representation of storage volume groups mapped to host ports in a storage management system.
Figure 2B:
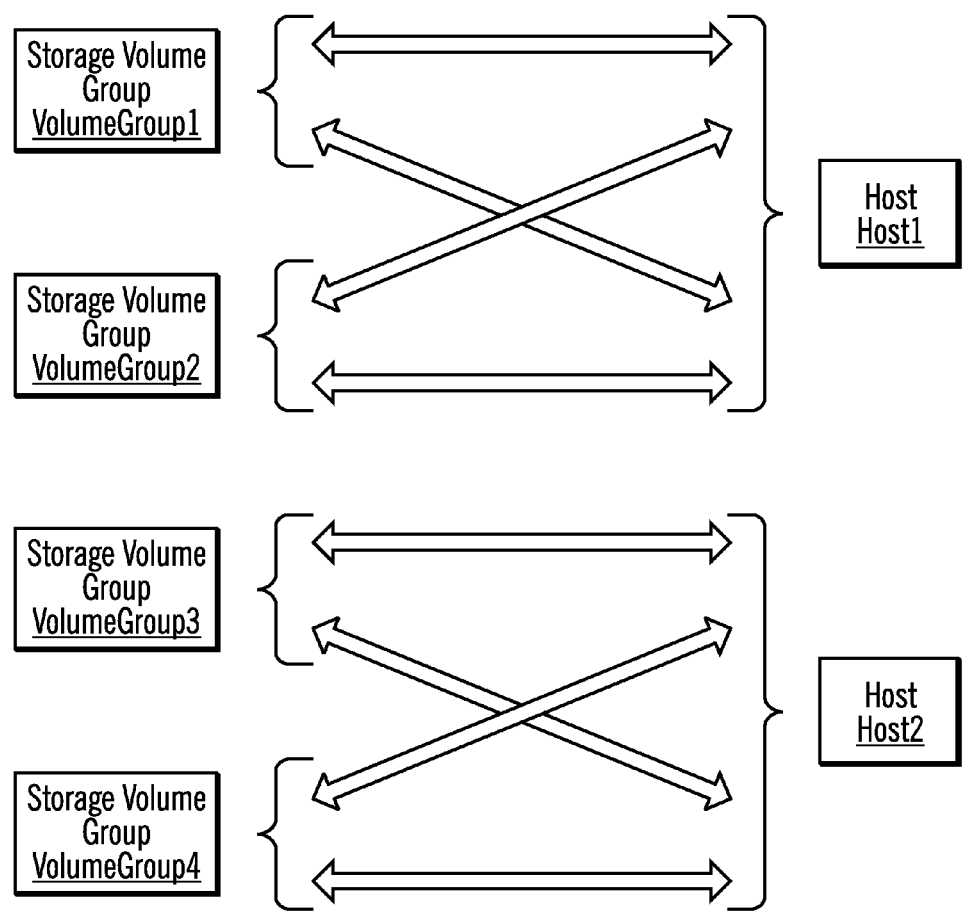
FIG. 2b is a graphical representation of storage volume groups mapped to hosts ports in a storage management system.

FIG. 2a depicts one example of such a mapping between storage volume groups and host ports. Some earlier generation storage management systems were limited to managing the mappings between storage volumes (or storage volume groups) and host ports. By comparison, FIG. 2b depicts an example of a mapping between storage volume groups and hosts. Later generation storage management systems are frequently not limited to managing the mappings between storage volumes and host ports, but may also be capable of managing mapping between storage volumes (or storage volume groups) and hosts (or host clusters).

In the example of FIG. 2a, the storage volume group, storage volumegroup1 is depicted as being mapped to both host hostport1 and host hostport2. Accordingly, appropriate signal paths are provided by the storage controller and the connection fabrics so that write data from host port hostport1 can be directed to storage volumegroup1, and conversely, read data from storage volumegroup1 can be directed to the host port, hostport1, for example. Signal paths are similarly provided between the storage volume group, storage volumegroup1 and the host port, hostport2 to which the storage volume group, storage volumegroup1, has also been mapped. However, because the storage volume group, storage volumegroup1 has not been mapped to other host ports such as the host port hostport3 or the host port hostport4 in this example, signal paths between the storage volume group, storage volumegroup1 and the host port, hostport3 or hostport4 are not provided. Hence, the storage environment has not been configured for data transfers between the storage volume group, storage volumegroup1 and the host ports, hostport3 and hostport4.

In the event that the host port, hostport1 fails, for example, it is noted that the storage volume group, storage volumegroup1 would still be able to communicate with the host port, hostport2 to which storage volume group, storage volumegroup1 is also mapped. However, in those prior generation storage management systems which do not maintain system configuration data identifying to which host or hosts particular host ports have been interconnected, it may not be readily apparent to the prior generation storage management system or an administrator using the management system, the specific host to which storage volume group, storage volumegroup1 has a data path due to the failure of the host port, hostport1.

To avoid such problems, a later generation storage management system may be acquired by a user, which has (or may be upgraded to have) the capability of storing system configuration data identifying to which host, each volume or volume group, has been assigned as depicted in FIG. 2b. Thus, if the storage management system contains system configuration data identifying that the storage volume group, storage volumegroup1 has been mapped to the host, host1 via the host port, hostport 1, for example, the storage management system can indicate that failure of the host port, hostport1 has caused loss of the data path from storage volume group, storage volumegroup1 to the host, host1 via the host port, hostport1.

In accordance with one aspect of the present description, a multiple mode data structure can facilitate a transition from an earlier generation storage management system to a later generation storage management system which identifies mappings of storage volumes (or groups of storage volumes) to hosts (or host clusters). FIGS. 3a-3d depict examples of operations of system component management of a storage management system, using multiple mode data structures in accordance with the present description. Host, host cluster and host port assignment configuration data obtained through an interface of the system component management 26 (FIG. 1a), and identifying which host or hosts (or host cluster or clusters), each volume and host port has been assigned, may be stored in suitable data structures including multiple mode system configuration data structures 60.

The system component management operations depicted in FIGS. 3a-3d using multiple mode system configuration data structures in accordance with the present description, may be performed by at least one or more of hardware, software, or firmware alone or in combination. In one embodiment, the system component management 26 (FIG. 1a) of the storage management system 32 is implemented as a part of the storage controller 58. It is appreciated that one or more of the operations of the system component management may be performed in whole or in part, in other devices such as one or more of the hosts, depending upon the particular application.

Figures 3A, 3B:
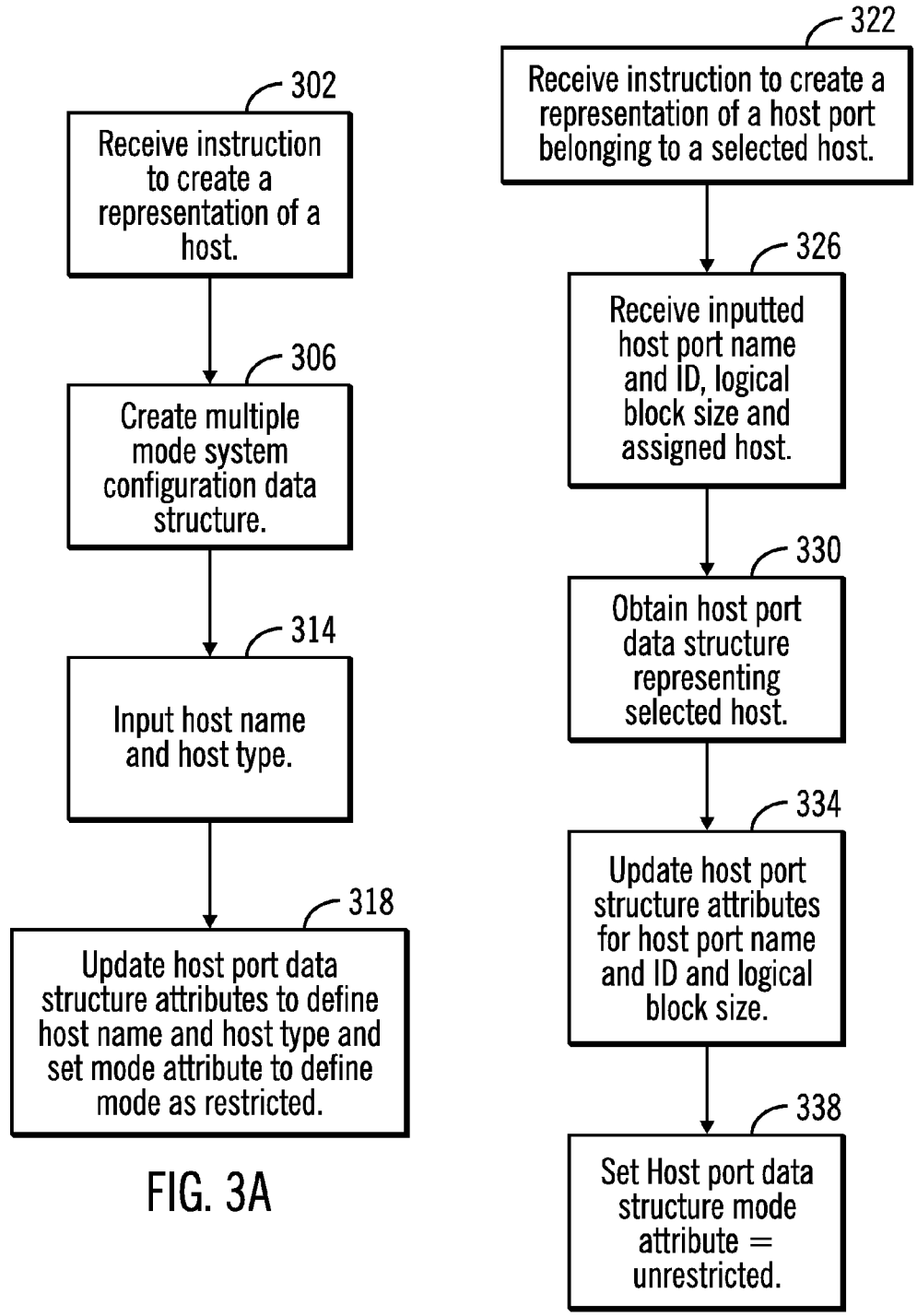

FIG. 3a is directed to operations of the host management module 26a (FIG. 1a), for creating a representation of a host, such as one of the hosts host1, host2 using a multiple mode system configuration data structure maintained by the system component management 26. In one operation, an instruction is received (block 302, FIG. 3a) to create a representation of a host. In one embodiment, the instruction may be received from a user through an interface such as a graphical user interface (GUI) of the system component management 26 (FIG. 1a). It is appreciated that a create host representation instruction may be provided by other sources, such as auto-generation, for example.

Figure 4A:
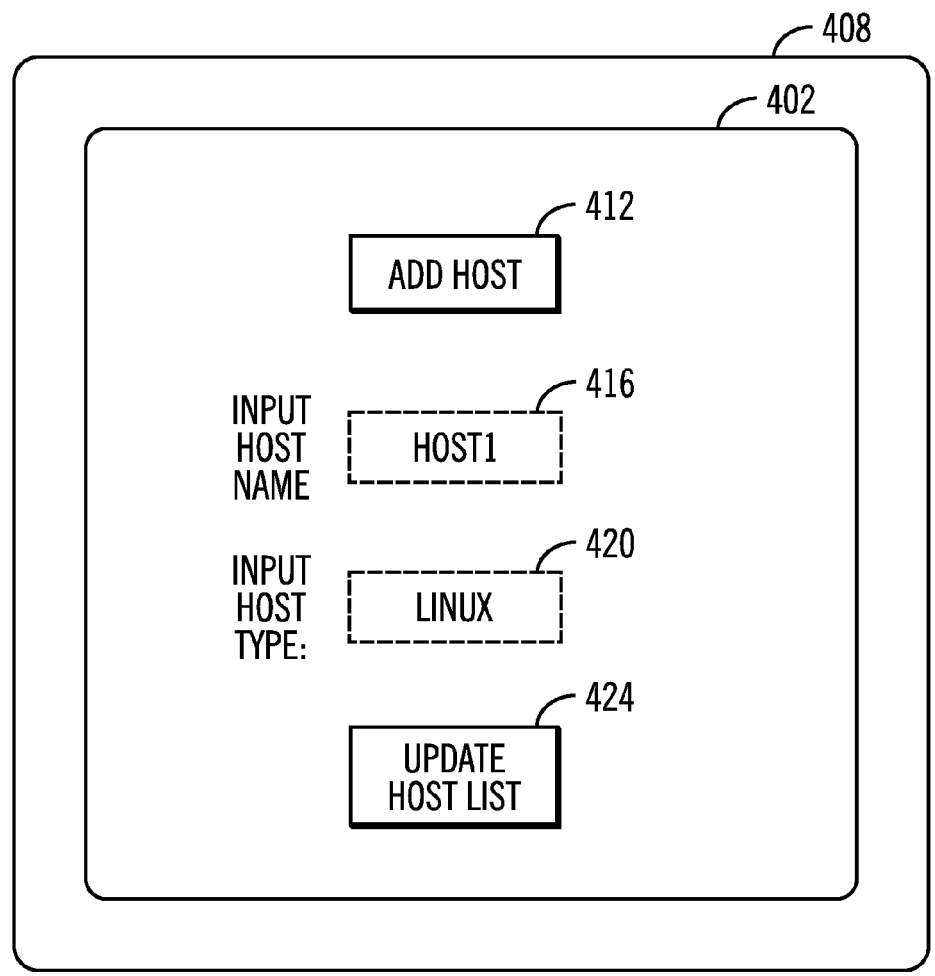

FIG. 4a shows an example of a GUI page or window 402 of the host management module 26a (FIG. 1a) displayed by a display 408 of the computing system of FIG. 1a, for example. In this example, a user may provide an instruction to the system component management of the storage system management to create a representation of a host by clicking on a user input button 412 labeled with the informational text "ADD HOST." It is appreciated that other types of GUI elements may be utilized, depending upon the particular application.

In response to receipt (block 302, FIG. 3a) of the instruction to create a representation of a host, a multiple mode system configuration data structure is created (block 306) (or otherwise obtained) which may have an undefined host port name attribute. In the illustrated embodiment, a host may be represented in the storage management system by a multiple mode system configuration data structure such as the multiple mode data structure 500 depicted in FIG. 5a. The system component management 26 of the storage management system 32 maintains multiple mode data structures such as the data structure 500 of FIG. 5a. Each multiple mode data structure is configured to be used by the storage management system in one of a first mode and a second mode, and is further configured to store system configuration data for a system component in the form of attribute data.

Figure 5A:
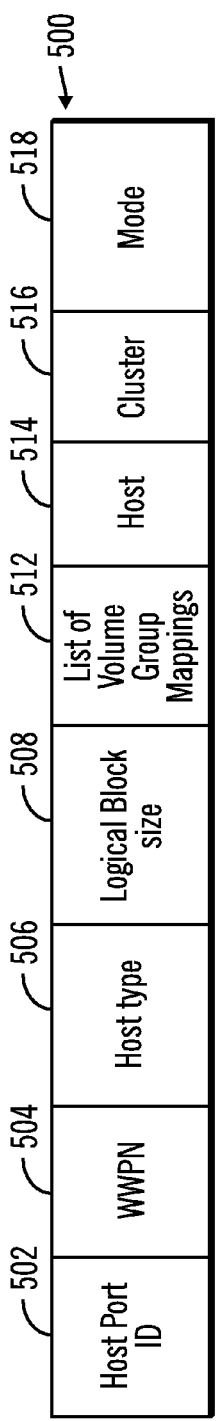

As shown in FIG. 5a, the multiple mode data structure 500, in one embodiment, includes attribute fields including an attribute field 502 to store a host port ID (identification) attribute, an attribute field 504 to store a host port name attribute such as a worldwide port name (WWPN), for example, an attribute field 506 to store a host type attribute, an attribute field 508 to store a logical block size attribute, an attribute field 512 to store a list of volume group mappings attribute, an attribute field 514 to store a host identification or name attribute, an attribute field 516 to store a host cluster name or identification attribute and an attribute field 518 to store a mode attribute, which will be explained in greater detail below. It is appreciated that in other embodiments, a multiple mode system configuration data structure may have additional attributes and attribute fields, fewer attributes and attribute fields or different attributes and attribute fields, depending upon the particular application.

In this embodiment, the host name attribute 514 when defined, indicates the name of a host to be represented by the multiple mode data structure. In this example, the name of the host to be represented by the created (or otherwise obtained) multiple mode data structure is inputted (block 314, FIG. 3a) from the user. The name of the host to be represented may be inputted for example, using the GUI 402 of FIG. 4a, for example. Thus, the host name such as host1, for example, may be input into a text field 416, for example. The host type such as AIX, Linux, VMWare, Windows, etc., may be input (block 314) though a suitable interface such as the text field 420, for example. It is appreciated that a host name or host port may be input using other input techniques.

Upon receipt of the name and type of the host to be represented in the storage management system, the corresponding attribute fields of the multiple mode system configuration data structure are updated (block 318). They may be updated automatically in response to the user's host name and type inputs or may be updated in response to receipt of an update instruction triggered by the user clicking on an "UPDATE HOST LIST" input button 424, for example.

Figure 5B:
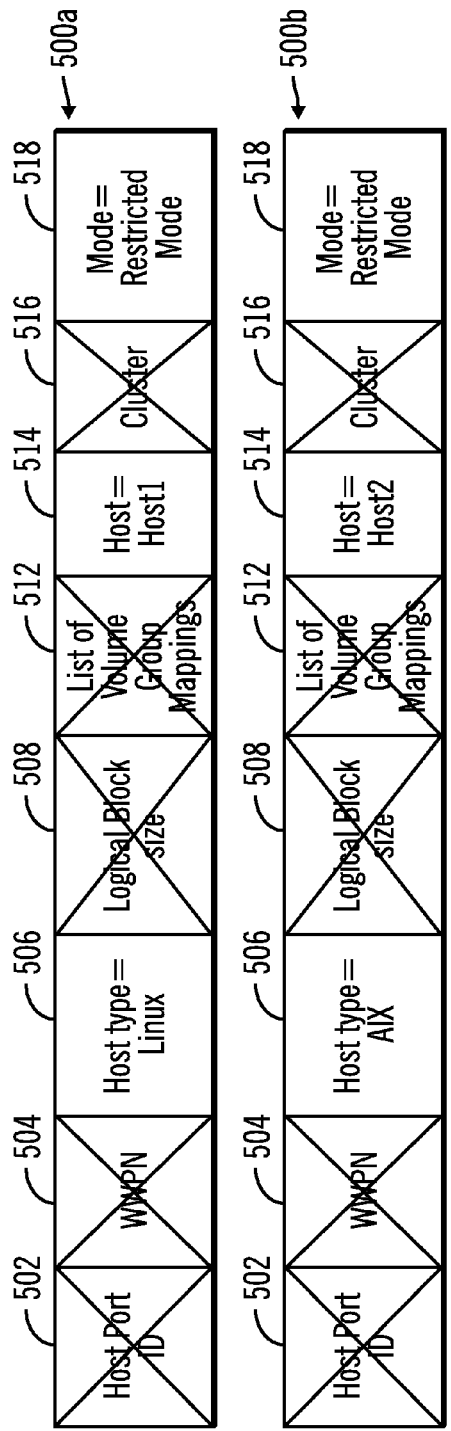

FIG. 5b shows one example of a multiple mode data structure 500a after it has been updated following the inputs provided by the add host interface of FIG. 4a. As shown in FIG. 5b, the host name attribute field 514 of the data structure 500a has been updated to define the name of the host, in this example, Host1, which is represented by the data structure. Similarly, the host type attribute field 506 has been updated to define the host type of the host represented by the data structure 500 as "Linux" in this example However, the host port attributes including the host port ID attribute field 502, the host port name attribute field 504, the logical block size attribute field 512 and the cluster name attribute field 516 remain undefined as graphically indicated by the "X" overlaying each field. An attribute field may be undefined by storing blank text in the field, for example, or by storing text identifying the field as undefined.

Thus, in this example of FIG. 5b, the multiple mode data structure 500a has an undefined host port name attribute including the host port ID attribute field 502, and the host port name attribute field 504. In the illustrated embodiment a multiple mode data structure such as the data structure 500a of FIG. 5b which has an undefined host port name attribute and a defined host name attribute may be used by the system component management 26 (FIG. 1a) of the storage management system 32 in a restricted mode, to represent a host, Host1 in this example, identified by the defined host name attribute field 514, and is restricted from representing a host port in the storage management system when a host port name or host port ID attribute is undefined.

Each multiple mode data structure 500 is further configured to store in a mode attribute field 518, in this example, a mode attribute to indicate when defined, the mode of use of the multiple mode data structure by the storage management system. In this example, the mode of use for the multiple mode data structure 500a of FIG. 5b has been updated (block 318, FIG. 3a) to indicate in the mode attribute field 518 that the mode of use of the multiple mode data structure is a restricted use mode since the host port ID and host port name of the data structure 500a of FIG. 5b remain undefined at this point in time as represented in FIG. 5b.

One consequence of the mode of use of the multiple mode data structure 500a of FIG. 5b being restricted to representing a host, Host1 in this example (or as a host cluster as described in another example below), and restricted from representing a host port, is that the multiple mode data structure 500a of FIG. 5b is hidden by the storage management system from other components and modules of the storage management system such as the mapping management module 26d (FIG. 1b) which maps storage volumes or storage volume groups to host ports since the host port attribute data remains undefined in the data structure 500a of FIG. 5b. As noted above, no host port assigned to the host, Host1 in this example, has been defined by the multiple mode data structure 500a of FIG. 5b, in the restricted use mode. However, the multiple mode data structure 500a of FIG. 5b, in the restricted use mode is not hidden from the host list portion of the host management module 26a (FIG. 1) of the system component management 26 for purposes of representing a host, Host1 in this example, which has been added to the storage management system 32. It is appreciated that other restrictions may apply, depending upon the particular application, for a multiple mode data structure being used in a restricted use mode.

A representation of each other host in the computer system may be added in a similar manner as that described above in connection with the host host1. Thus, a representation of the host, host2 may be added using the "Add Host" interface of FIG. 4a, which creates a multiple mode system configuration data structure 500b for the host, host1, as shown in FIG. 5b. As shown therein the host attribute field 514 of the data structure 500b has been defined to indicate the name of the host, host2 in this example. The host type attribute field 506 has been defined to indicate the host type of the host host2 as an AIX host type in this example. Because the host port name and host port ID attribute fields remain undefined at this point in the data structure 500b, the mode attribute field 518 of the multiple mode data structure 500b is defined as the restricted mode in a manner similar to that of the data structure 500a for the host host1 as described above.

FIG. 3b is directed to operations of the host port management module 26b (FIG. 1a), that is, creating (or otherwise obtaining) in the system component management 26, a representation of a host port, such as a representation of the host port hostport1, for example, using a multiple mode system configuration data structure maintained by the system component management 26. In one operation, an instruction is received (block 322, FIG. 3b) to create a representation of a host port. In one embodiment, the instruction may be received from a user through an interface such as a graphical user interface (GUI) of the system component management 26 (FIG. 1a). It is appreciated that a create host port representation instruction may be provided by other sources, such as auto-generation, for example.

Figure 4B:
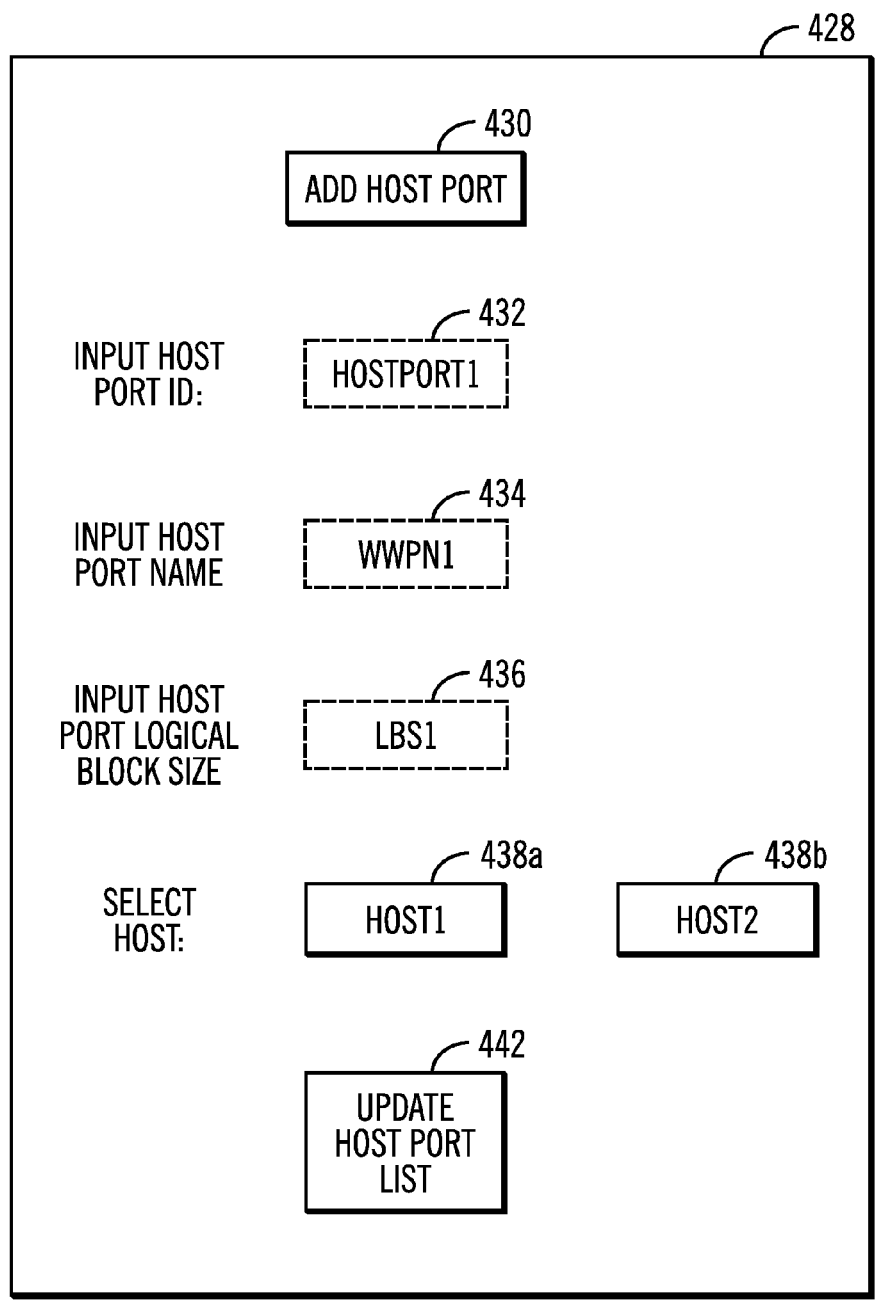

FIG. 4b shows an example of a GUI page or window 428 of the host port management module 26b (FIG. 1a) displayed by the display 408 (FIG. 4a) of the computing system of FIG. 1a, for example. In this example, a user may provide an instruction to the system component management of the storage system management to create a representation of a host port by clicking on a user input button 430 labeled with the informational text "ADD HOST PORT." It is appreciated that other types of GUI elements may be utilized, depending upon the particular application.

In response to receipt (block 322, FIG. 3b) of the instruction to create a representation of a host port, the add host port interface 428 (FIG. 4b) enables the input (block 326, FIG. 3b) of system configuration data for the host port representation to be created. In this example, the host port for which a representation is to be created is the host port, hostport1. The name and identification of the host port, hostport1 in this example, to be represented may be inputted (block 326, FIG. 3b) for example, using the "ADD Host Port" GUI 428 of FIG. 4b, for example. Thus, the host port ID such as hostport1, for example, may be input into a text field 432, for example. The host port name such as WWPN1, in this example, may be input (block 326, FIG. 3b) though a suitable interface such as the text field 434, for example. The host port logical block size such as LBS1, in this example, may be input (block 326, FIG. 3b) though a suitable interface such as the text field 436, for example. In this example, the host port hostport1 is assigned to the host, host1. Accordingly, the host, host1 in this example, assigned to the host port hostport1 may be input (block 326, FIG. 3b) though a suitable interface such as clicking an appropriate input button 438a, 438b. In this example, the hosts, host1 and host2 have previously been added to the list of hosts represented in the system component management 26 as described above in connection with FIGS. 4a and 5a. Accordingly, the "ADD HOST PORT" GUI 428 has an input button 438a, 438b, for each of the added hosts, host1, host2, respectively, and are labeled with the associated host name as shown in FIG. 4b. In this example, the host port, hostport1, has been assigned to the host, host1. Accordingly, the user clicks on the host1 input button 438a to select the host, host1, as the host assigned to the host port, hostport1. It is appreciated that system configuration data may be input to define host port attributes, using other input techniques, depending upon the particular application.

Upon receipt (block 326, FIG. 3b) of the system configuration data for the host port to be represented, the appropriate multiple mode data structure 500 is obtained (block 330, FIG. 3b) for the host port representation being added. In accordance with one aspect of the present description, since the host port representation being added to the system component management is a representation for the host port, hostport1, and the host port, hostport1, has been assigned to the host, host1, the multiple mode system configuration data structure 500a created to represent the host, host1, may be obtained and utilized to represent not only the host host1, as described above, but also may provide a representation for the host port, hostport1, being added to the system component management 26 (FIG. 1a).

Figure 5C:
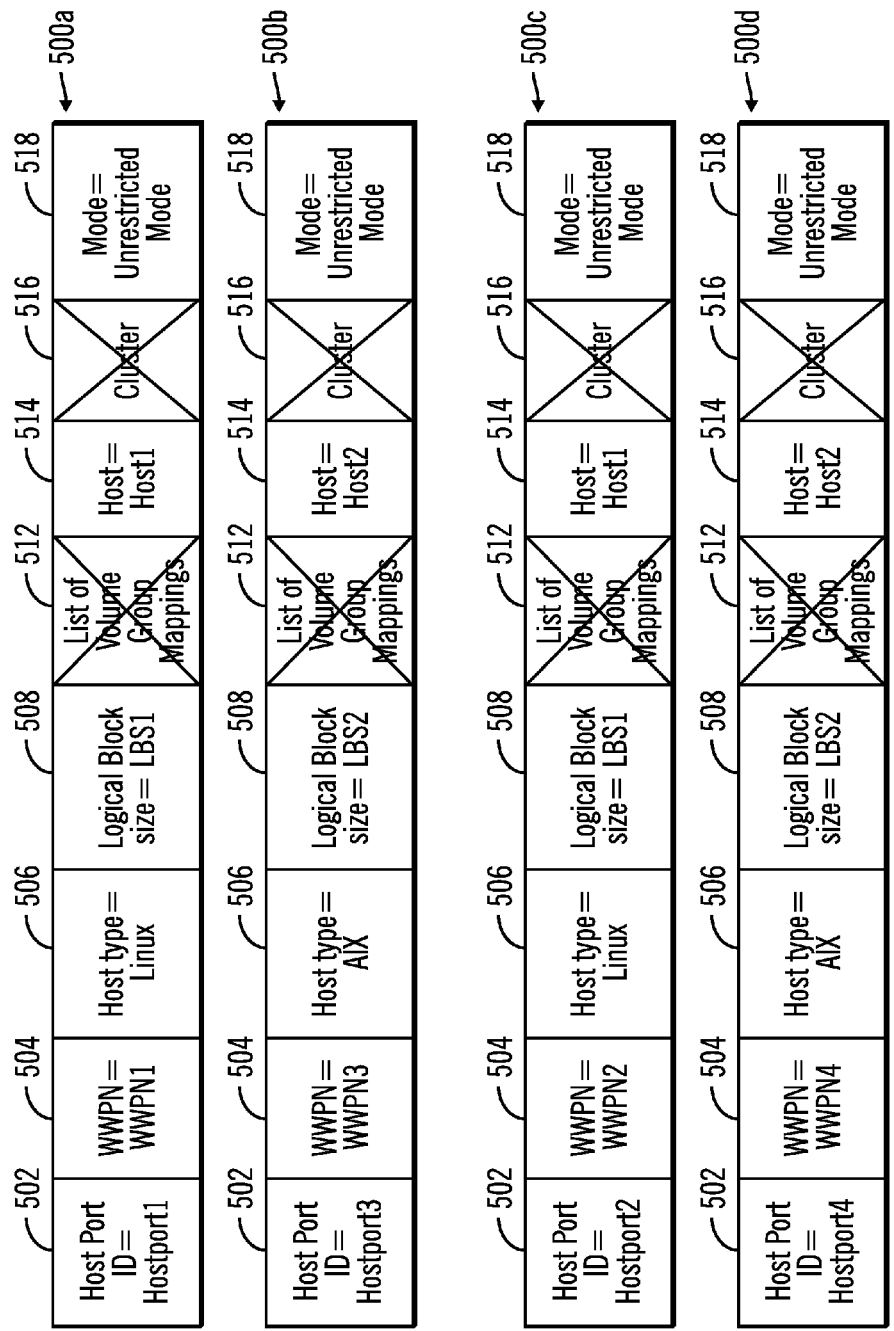

FIG. 5c depicts the multiple mode system configuration data structure 500a updated (block 334, FIG. 3b) with the host port system configuration data inputted (block 326)

through the "add host port" GUI 428 (FIG. 4*b*) for the host port, hostport1, as described above. In this embodiment, the updating (block 334) occurs in response to an update instructed received in response to the user clicking on an "Update Host Port List" input button 442. It is appreciated that such an updating instruction may be auto-generated, for example.

In this example, the host port ID field 502 has been updated to define the host port identification as hostport1, the host port name field 504 has been updated to define the host port name as WWPN1, and the logical block size field 506 has been updated to define the logical block size as a value LBS1.

Thus, in this example of FIG. 5*c*, the multiple mode data structure 500*a* has a defined host port name attribute including the host port ID attribute field 502, and the host port name attribute field 504. In the illustrated embodiment a multiple mode data structure such as the data structure 500*a* of FIG. 5*c* which has a defined host port name attribute and a defined host name attribute may be used by the system component management 26 (FIG. 1*a*) of the storage management system 32 in an unrestricted mode, to represent both a host, Host1 in this example, identified by the defined host name attribute field 514, and may also represent a host port, hostport1, in this example in the storage management system since the a host port name or host port ID attribute is defined. In this example, the mode attribute field 518 of the data structure 500*a* of FIG. 5*c* has been updated (block 338, FIG. 3*b*) to indicate that the mode of use of the multiple mode data structure is an unrestricted use mode since the host port ID and host port name of the data structure 500 of FIG. 5*b* have been defined at this point in time as represented in FIG. 5*c*.

One consequence of the multiple mode data structure 500*a* of FIG. 5*c* being unrestricted to representing a both a host, Host1, and a host port, hostport1, in this example, is that the multiple mode data structure 500*a* of FIG. 5*c* is not hidden by the storage management system from other components and modules of the storage management system such as the mapping management module 26*d* (FIG. 1*b*) which maps storage volumes or storage volume groups to host ports since storage volumes and storage volume groups are mapped to hosts through host ports in the illustrated embodiment. As a result, the unrestricted use data structure 500*a* of FIG. 5*c* is available for use by other components and modules of the storage management system such as the mapping management module 26*d* (FIG. 1*b* It is appreciated that other capabilities may apply in the unrestricted mode, depending upon the particular application, for a multiple mode data structure being used in an unrestricted use mode.

The add host port operations of FIG. 3*b* may be repeated to create representations for each of the remaining host ports of the system. In the illustrated example, the host port, hostport3, has been assigned to the host, host2 for which a restricted use multiple mode system configuration data structure 500*b* was created to represent the host, host2 as shown in FIG. 5*b*. Thus, the restricted use multiple mode system configuration data structure 500*b* of FIG. 5*b* representing the host, host2, may be obtained (block 330) and updated (block 334) using the interface 428 (FIG. 4*b*) to input (block 326) system configuration data for the host port, hostport3, to populate the host port attribute fields of the data structure 500*b*, with the attribute data of the host port, host port3 as shown in FIG. 5*c*. In addition, the mode attribute field 518 of the data structure 500*b* of FIG. 5*c* is updated (block 338, FIG. 3*b*) to indicate that the mode of use of the multiple mode data structure 500*b* is an unrestricted use mode since the host port ID and host port name of the data structure 500*b* have been defined at this point in time as represented in FIG. 5*c*.

A representation for the host port, hostport2 may be added using the add host port operations of FIG. 3*b* and the interface 428 (FIG. 4*b*) in a similar fashion. In the illustrated example, the host port, hostport2, as well as the host port, hostport1, have been assigned to the host, host1. Since the multiple mode system configuration data structure 500*a* created to represent the host, host1, is already being used to represent the host port, hostport1, as described above, another multiple mode system configuration data structure 500*c* is obtained (block 330, FIG. 3*b*) by creating the data structure 500*c* to represent the host port, hostport2 being added as shown in FIG. 5*c*. Thus, an unrestricted use multiple mode system configuration data structure 500*c* of FIG. 5*b* representing the host, host1, and the host port, hostport2, may be obtained (block 330) and updated (block 334) using the interface 428 (FIG. 4*b*) to input (block 326) system configuration data for the host port, hostport2, to populate the host port attribute fields of the data structure 500*c*, with the attribute data of the host port, host port2 as shown in FIG. 5*c*. Further, the unrestricted use multiple mode system configuration data structure 500*c* of FIG. 5*b* representing the host, host1, and the host port, hostport2, may be updated (block 334) using the interface 428 (FIG. 4*b*) to input (block 326) system configuration data for the host, host1, to populate the host attribute fields 514, 506 of the data structure 500*c*, with the attribute data of the host as shown in FIG. 5*c*. In addition, the mode attribute field 518 of the data structure 500*c* of FIG. 5*c* is updated (block 338, FIG. 3*b*) to indicate that the mode of use of the multiple mode data structure 500*b* is an unrestricted use mode since the host port ID and host port name of the data structure 500*c* have been defined at this point in time as represented in FIG. 5*c*.

A representation for the host port, hostport4 may be added using the add host port operations of FIG. 3*b* and the interface 428 (FIG. 4*b*) in a similar fashion. In the illustrated example, the host port, hostport4, as well as the host port, hostport3, have been assigned to the host, host2. Since the multiple mode system configuration data structure 500*b* created to represent the host, host2, is already being used to represent the host port, hostport3, as described above, another multiple mode system configuration data structure 500*d* is obtained (block 330, FIG. 3*b*) by creating the data structure 500*d* to represent the host port, hostport4 being added as shown in FIG. 5*c*. Thus, an unrestricted use multiple mode system configuration data structure 500*d* representing the host, host2, and the host port, hostport4, may be obtained (block 330) and updated (block 334) using the interface 428 (FIG. 4*b*) to input (block 326) system configuration data for the host host2 and the host port, hostport4, to populate the host and host port attribute fields of the data structure 500*d*, with the attribute data of the host host2 and host port, host port4 as shown in FIG. 5*c*. In addition, the mode attribute field 518 of the data structure 500*d* of FIG. 5*c* is updated (block 338, FIG. 3*b*) to indicate that the mode of use of the multiple mode data structure 500*d* is an unrestricted use mode since the host port ID and host port name of the data structure 500*d* have been defined at this point in time as represented in FIG. 5*c*.

Figure 6A:
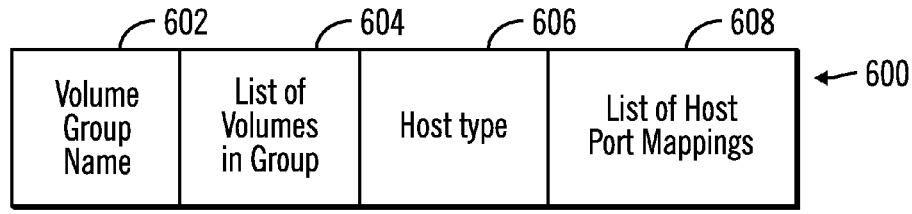

At the point in time represented by the data structures 500*a*-500*d*, the list of volume group mappings attribute of the attribute field 512, the host cluster name attribute of the attribute field 516, each remain undefined. FIG. 6*a* shows an example of a system configuration data structure 600 which may be employed by the system component management 26 to represent a volume group such as one of the volume groups volumegroup1-volumegroup4 of FIG. 1*a*. As shown in FIG. 6*a*, the volume group data structure 600, in one embodiment, includes attribute fields including an attribute field 602 to store a volume group name attribute, an attribute field 604 to store a list of storage volumes which have been grouped into the volume group, an attribute field 606 to store a host type attribute, and an attribute field 608 to store a list of host port mappings attribute, which will be explained in greater detail below. It is appreciated that in other embodiments, a volume group system configuration data structure may have additional attributes and attribute fields, fewer attributes and attribute fields or different attributes and attribute fields, depending upon the particular application. Also, although the system configuration data structure 600 is depicted for use in representing a volume group, it is appreciated that a system configuration data structure may be employed to represent single volumes, either in addition to or instead of the volume group data structure 600.

Figure 6B:
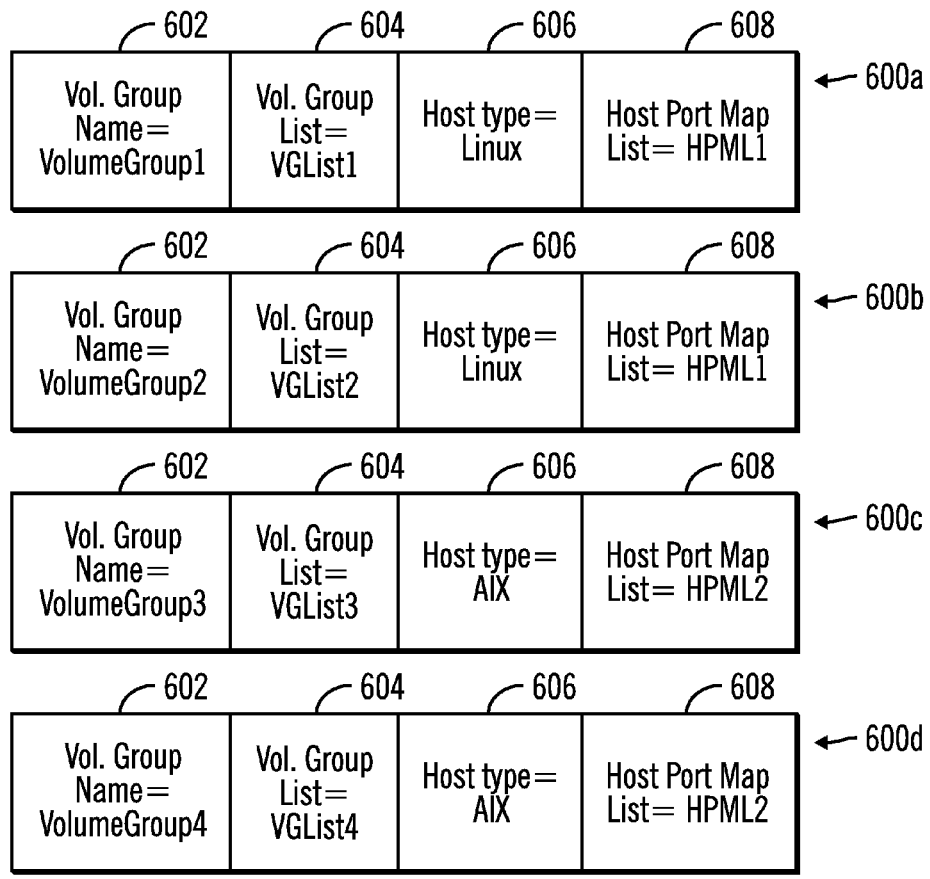

The attribute fields of a volume group data structure 600 may be populated with system configuration data for each of the storage volume groups, such as the volume groups volumegroup1-volumegroup4 of FIG. 1*a*. Thus, FIG. 6*b* shows a volume group data structure 600*a* in which system configuration data for the storage volume group volumegroup1 has been stored. In a similar manner, FIG. 6*b* shows volume group data structures 600*b*, 600*c* and 600*d* in which system configuration data for the storage volume groups, volumegroup2, volumegroup3 and volumegroup4, respectively have been stored.

Each volume group data structure 600*a*-600*d* may be created and the attribute fields 602, 604, 606 for the volume group name, volume group list, and host type attributes, respectively, populated using appropriate interfaces of the volume group management module 26*c* (FIG. 1*b*), which interfaces may be similar to those described above in connection with hosts and host port. In this example, the list of volumes from which the volume group volumegroup1 was created has been inputted and the volume group list attribute field 604 for the volume group data structure 600*a* for the volume group volumegroup1 has been updated to define the volume group list attribute as the value VGList1, identifying the volumes of the volume group, volumegroup1. In a similar manner, the list of volumes from which the volume group volumegroup2 was created has been inputted and the volume group list attribute field 604 for the volume group data structure 600*b* for the volume group volumegroup2 has been updated to define the volume group list attribute as the value VGList2, identifying the volumes of the volume group, volumegroup2. Further, the host type "LINUX" has been inputted and the host type attribute field 606 has been updated to define the host type attribute to indicate "LINUX" for the volume group data structures 600*a*, 600*b* of the storage volumes groups, volumegroup1, volumegroup2, respectively. Similarly, in this example, the host type "AIX" has been inputted and the host type attribute field 606 has been updated to define the host type attribute to indicate "AIX" for the volume group data structures 600*c*, 600*d* of the storage volumes groups, volumegroup3, volumegroup4, respectively. Similarly, the lists of volumes from which the volume groups volumegroup2 and volumegroup3 were each created have been inputted and the volume group list attribute field 604 for the volume group data structures 600*c* and 600*d* for the volume groups volumegroup2 and volume group3, respectively, have been updated to define the volume group list attribute as the value VGList3, and VGList4, respectively, identifying the volumes of the volume groups, volumegroup3 and volumegroup4, respectively.

Figures 3C, 3D:
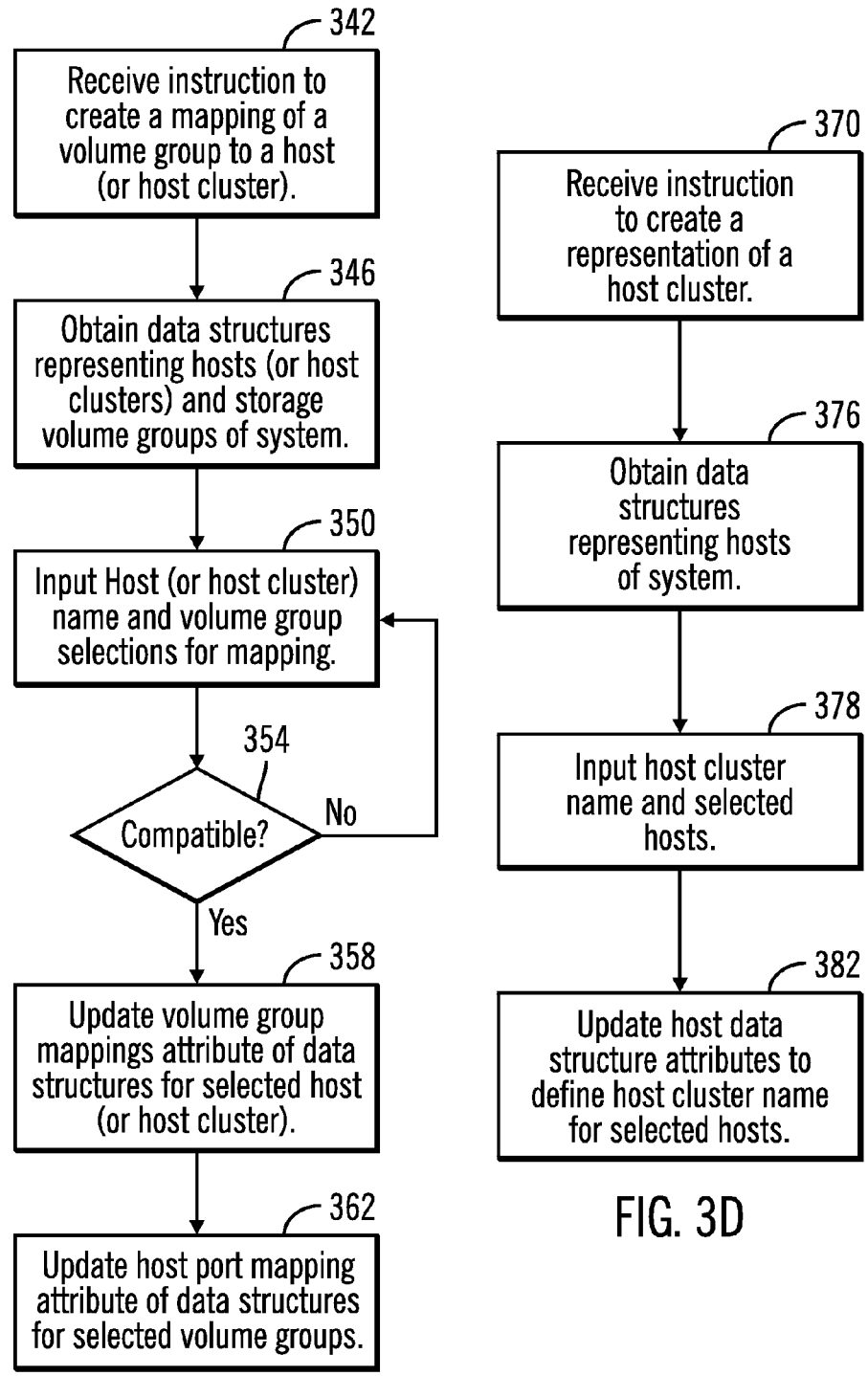

FIG. 3*c* is directed to operations of a host management module 26*d* (FIG. 1*a*), that is, mapping volume groups to host clusters (if defined) or hosts such as one of the hosts host1, host2 using the volume group data structures and multiple mode data structures described above and maintained by the system component management 26. Although the operations of FIG. 3*c* may also relate to mapping host clusters, the operations of FIG. 3*c* will first be described in connection with mapping volume groups to hosts. In one operation, an instruction is received (block 342, FIG. 3*c*) to create a representation of a mapping of a volume group to a host. In one embodiment, the instruction may be received from a user through an interface such as a graphical user interface (GUI) of the system component management 26 (FIG. 1*a*). It is appreciated that a create mapping representation instruction may be provided by other sources, such as auto-generation, for example.

Figure 4C:
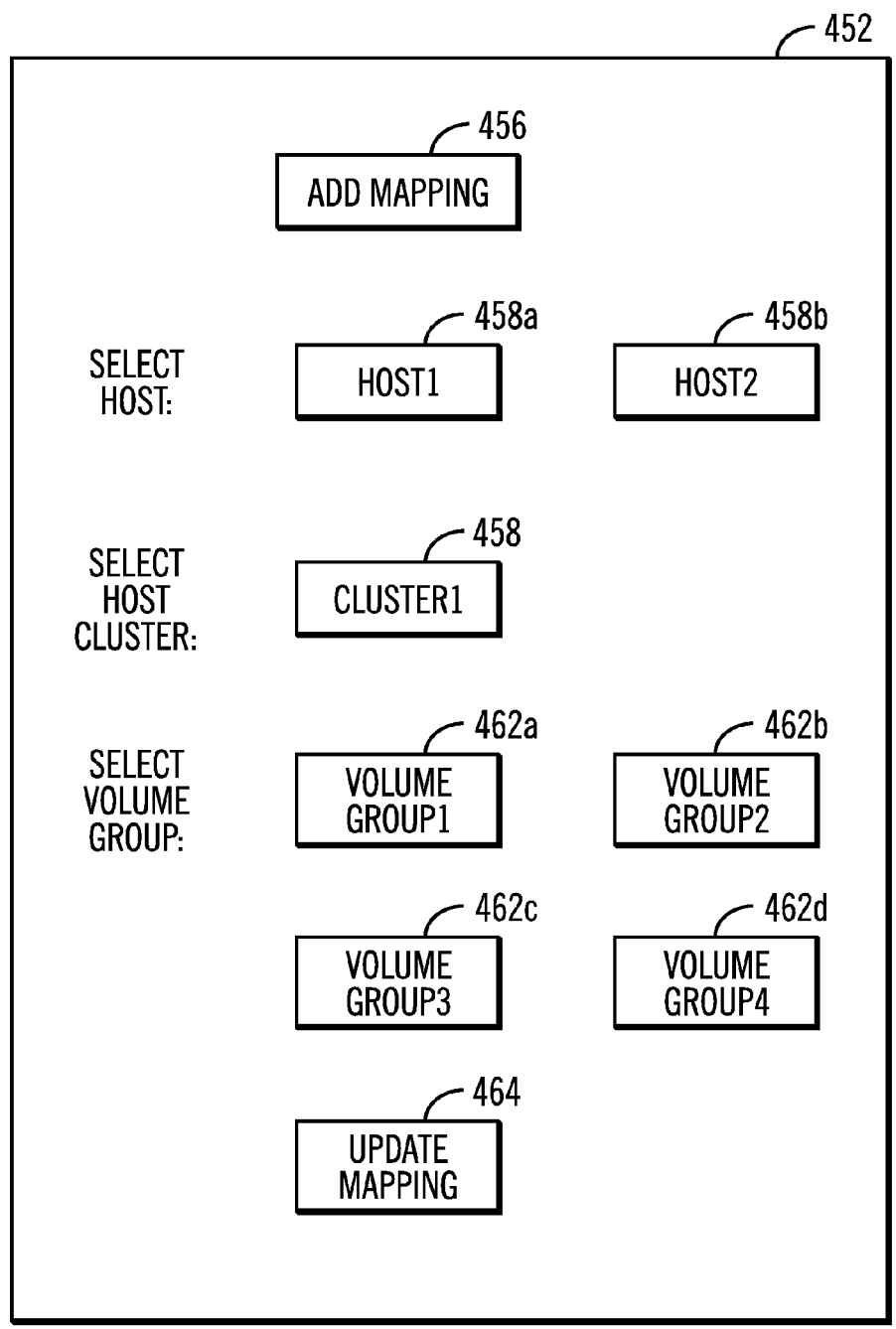

FIG. 4*c* shows an example of a GUI page or window 452 of the host management module 26*a* (FIG. 1*a*) displayed by a display 408 (FIG. 4*a*) of the computing system of FIG. 1*a*, for example. In this example, a user may provide an instruction to the system component management of the storage system management to create a representation of a mapping by clicking on a user input button 456 labeled with the informational text "ADD MAPPING." It is appreciated that other types of GUI elements may be utilized, depending upon the particular application.

In response to receipt (block 342, FIG. 3*c*) of the instruction to create a representation of a mapping, the data structures created and populated to represent the hosts and volume groups added to the system are obtained (block 346). Accordingly, in this example, the multiple mode system configuration data structures 500*a*-500*d* (FIG. 5*c*) representing the hosts, host1 and host2 are obtained and the volume group data structures 600*a*-600*d* (FIG. 6*b*) representing the volume groups, volumegroup1-volumegroup4, are obtained.

In this example, a user may use the interface 452 to select a host such as host1 or host2 for the mapping by clicking on an input button 458*a*, or 458*b* bearing an appropriate information label such as "Host1" or "Host2", respectively, for the names of the hosts from which the host of the mapping may be selected. Similarly, a user may select one or more volume groups such as Volumegroup1, Volumegroup2, Volumegroup3 or Volumegroup4 for the mapping by clicking on an input button 462*a*, or 462*b*, 462*c*, or 462*d*, bearing an appropriate information label such as "Volumegroup1," "Volumegroup2," "Volumegroup3" or "Volumegroup4" respectively, for the names of the volume groups from which the volume group or groups may be selected.

The host and volume group or groups selected for the mapping may be input (block 350, FIG. 3*c*) and a determination made as to whether the selected host and volume group or groups are compatible. In one example, the user may select volume groups volumegroup1 and volumegroup2 to be mapped to the host, host1. As indicated by the volume group data structures 600*a*, 600*b* (FIG. 6*b*) representing the volume groups, volumegroup1 and volumegroup2, respectively, and the multiple mode data structures 500*a*, 500*c* (FIG. 5*c*) representing the host, host1, the host types are defined as the same, that is, host type Linux, and therefore may be deemed (block 354, FIG. 3*c*) to be compatible.

Figure 5D:
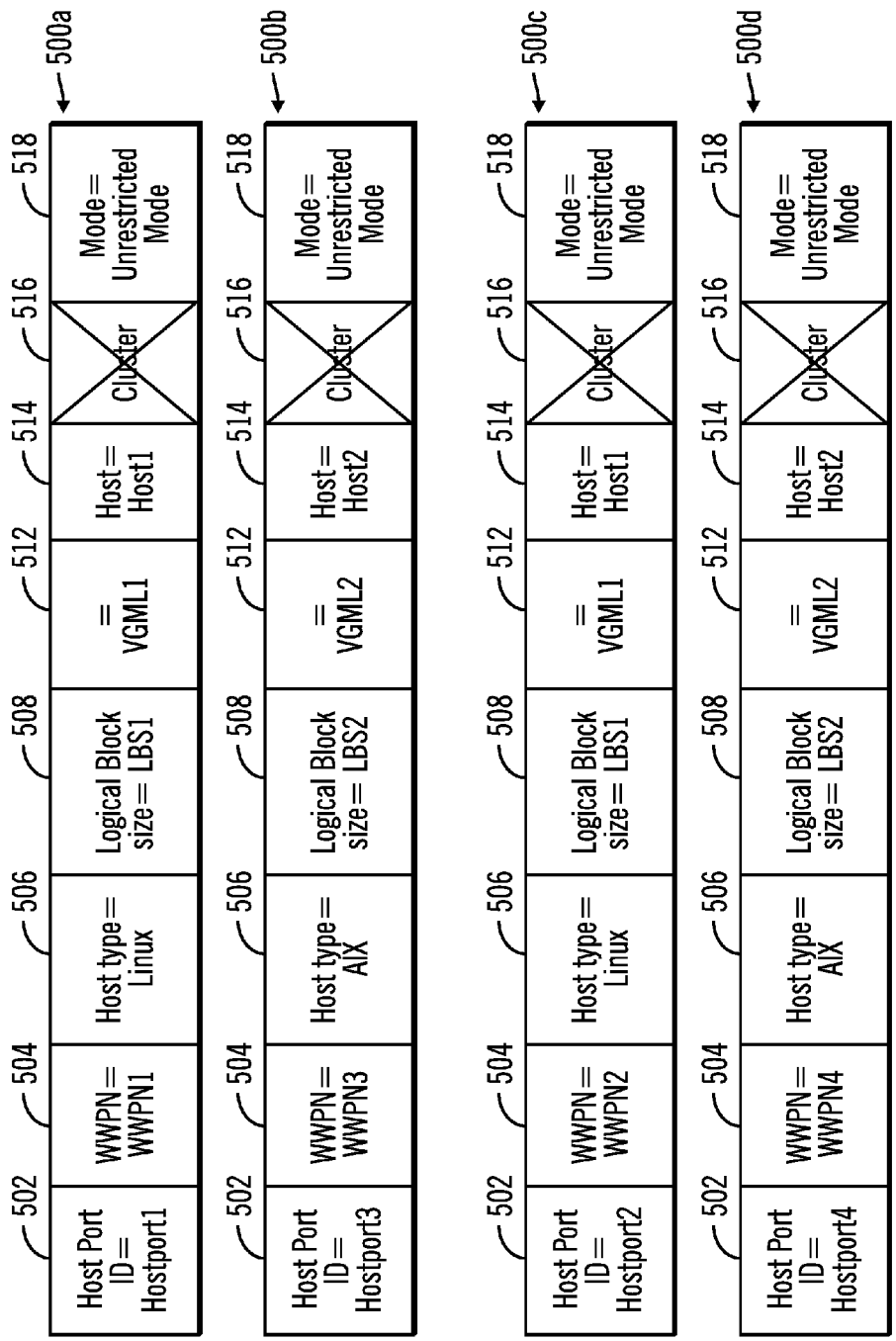

Accordingly, the volume group mappings attribute for the data structures for the selected host, host1 in this example, may be updated (block 358) to indicate the list of volume groups which have been mapped to the selected host. In this embodiment, the updating (block 358) occurs in response to an update instruction received in response to the user clicking on an "Update Mapping" input button 464 (FIG. 4c). It is appreciated that such an updating instruction may be auto-generated, for example. FIG. 5d shows the list of volume group mappings attribute field 512 of the multiple mode data structures 500a, 500c representing the selected host, host1, as updated to define the list of volume group mappings attribute as the value VGML1 which in this example, is a list comprising volume groups volumegroup1 and volumegroup2 have been mapped to the selected host, host1.

In addition, host port mapping list attribute, for the data structures for the selected volume groups, volumegroup1 and volumegroup2 in this example, may be updated (block 362) to indicate the list of host ports which have been mapped to the selected volume groups. FIG. 6b shows the host port map list attribute field 608 of the volume group data structures 600a, 600b representing the selected volume groups, volumegroup1 and volumegroup2, respectively, as updated to define the host port map list attribute as the value HPML1 which in this example, is a list comprising host ports, hostport1 and hostport2, which were previously assigned to the selected host, host1 as indicated by the multiple mode data structures 500a, 500c, respectively, (FIG. 5d) representing the selected host, host1, as discussed above. Thus, the system component management system may determine the value HPML1 listing the host ports, hostport1 and hostport2, mapped to the selected volume groups, volumegroup1 and volumegroup2, by examining the host ports identified by the multiple mode data structures, data structures 500a, 500c in this example, representing the host, host1 in this example, selected for the mapping to the selected volume groups, volumegroup1 and volumegroup2, in this example.

In another example, if the user had selected volume groups volumegroup3 and volumegroup4 to be mapped to the host, host1, the proposed mapping would have been determined (block 354, FIG. 3c) as incompatible. As indicated by the volume group data structures 600c, 600d (FIG. 6b) representing the volume groups, volumegroup3 and volumegroup4, respectively, and the multiple mode data structures 500a, 500c (FIG. 5c) representing the selected host, host1, the host types are not defined as the same, that is, the host type of the host1 is Linux, and the host type of the volume groups volumegroup3 and volumegroup4 is AIX, in this example, and therefore may be deemed (block 354, FIG. 3c) not to be compatible. Accordingly, the proposed mapping is rejected and the user is provided the opportunity to select a different host and volume group mapping.

In another example, the user may select volume groups volumegroup3 and volumegroup4 to be mapped to the host, host2. As indicated by the volume group data structures 600c, 600d (FIG. 6b) representing the volume groups, volumegroup3 and volumegroup4, respectively, and the multiple mode data structures 500b, 500d (FIG. 5c) representing the host, host2, the host types are defined as the same, that is, host type AIX in this example, and therefore may be deemed (block 354, FIG. 3c) to be compatible.

Accordingly, the volume group mappings attribute for the data structures for the selected host, host2 in this example, may be updated (block 358) to indicate the list of volume groups which have been mapped to the selected host. FIG. 5d shows the list of volume group mappings attribute field 512 of the multiple mode data structures 500b, 500d representing the selected host, host2, as updated to define the list of volume group mappings attribute as the value VGML2 which in this example, is a list comprising volume groups volumegroup3 and volumegroup4 that have been mapped to the selected host, host2.

In addition, the host port mapping list attribute, for the data structures for the selected volume groups, volumegroup3 and volumegroup4 in this example, may be updated (block 362) to indicate the list of host ports which have been mapped to the selected volume groups. FIG. 6b shows the host port map list attribute field 608 of the volume group data structures 600c, 600d representing the selected volume groups, volumegroup3 and volumegroup4, respectively, as updated to define the host port map list attribute as the value HPML2 which in this example, is a list comprising host ports, hostport3 and hostport4, which were previously assigned to the selected host, host2 as indicated by the multiple mode data structures 500b, 500d, respectively, (FIG. 5d) representing the selected host, host2, as discussed above. Thus, the system component management system may determine the value HPML2 listing the host ports, hostport3 and hostport4, mapped to the selected volume groups, volumegroup3 and volumegroup4, by examining the host ports identified by the multiple mode data structures, data structures 500b, 500d in this example, representing the host, host2 in this example, selected for the mapping to the selected volume groups, volumegroup3 and volumegroup4, in this example.

FIG. 3d is directed to operations of a host management module 26e (FIG. 1a), that is, creating a representation of a host cluster, such as grouping of the hosts host1, host2 using a multiple mode system configuration data structure maintained by the system component management 26. In one operation, an instruction is received (block 370, FIG. 3d) to create a representation of a host cluster. In one embodiment, the instruction may be received from a user through an interface such as a graphical user interface (GUI) of the system component management 26 (FIG. 1a). It is appreciated that a create host cluster representation instruction may be provided by other sources, such as auto-generation, for example.

Figure 4D:
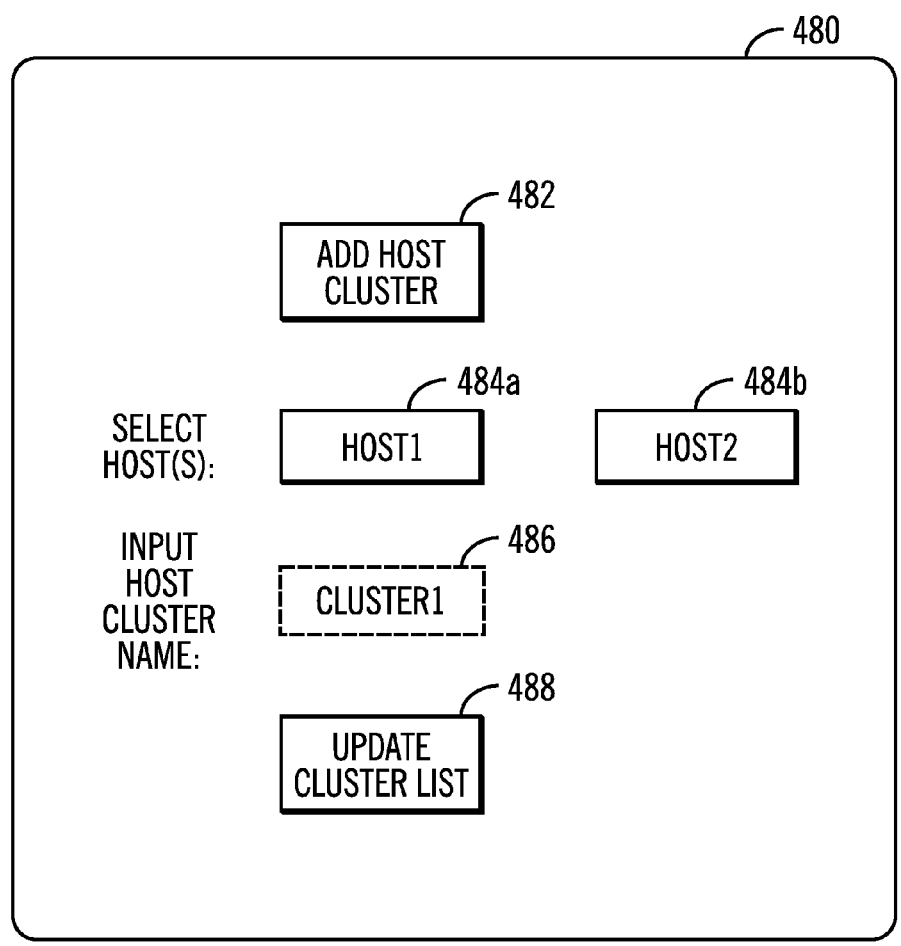

FIG. 4d shows an example of a GUI page or window 480 of the host management module 26e (FIG. 1b) displayed by a display 408 (FIG. 4a) of the computing system of FIG. 1a, for example. In this example, a user may provide an instruction to the system component management of the storage system management to create a representation of a host cluster by clicking on a user input button 482 labeled with the informational text "ADD HOST CLUSTER." It is appreciated that other types of GUI elements may be utilized, depending upon the particular application.

In response to receipt (block 370, FIG. 3D) of the instruction to create a representation of a host cluster, multiple mode system configuration data structures are obtained (block 376, FIG. 3d) representing the hosts which have been added to the system. In this example, hosts host1 and host2 have been added to the system. Also in this example, host host1 is represented by unrestricted use mode system configuration data structures 500a' and 500c' shown in FIG. 5e and are similar to the corresponding data structures depicted as data structures 500a, 500c in the example of FIG. 5d. However, in this example, at the operational point represented by block 376, FIG. 3d, attribute fields 512, 516 have not yet been defined and thus remain undefined. As explained in greater detail below, the attribute fields 512, 516 will later become defined as depicted in FIG. 5e in later operations.

Figure 5E:
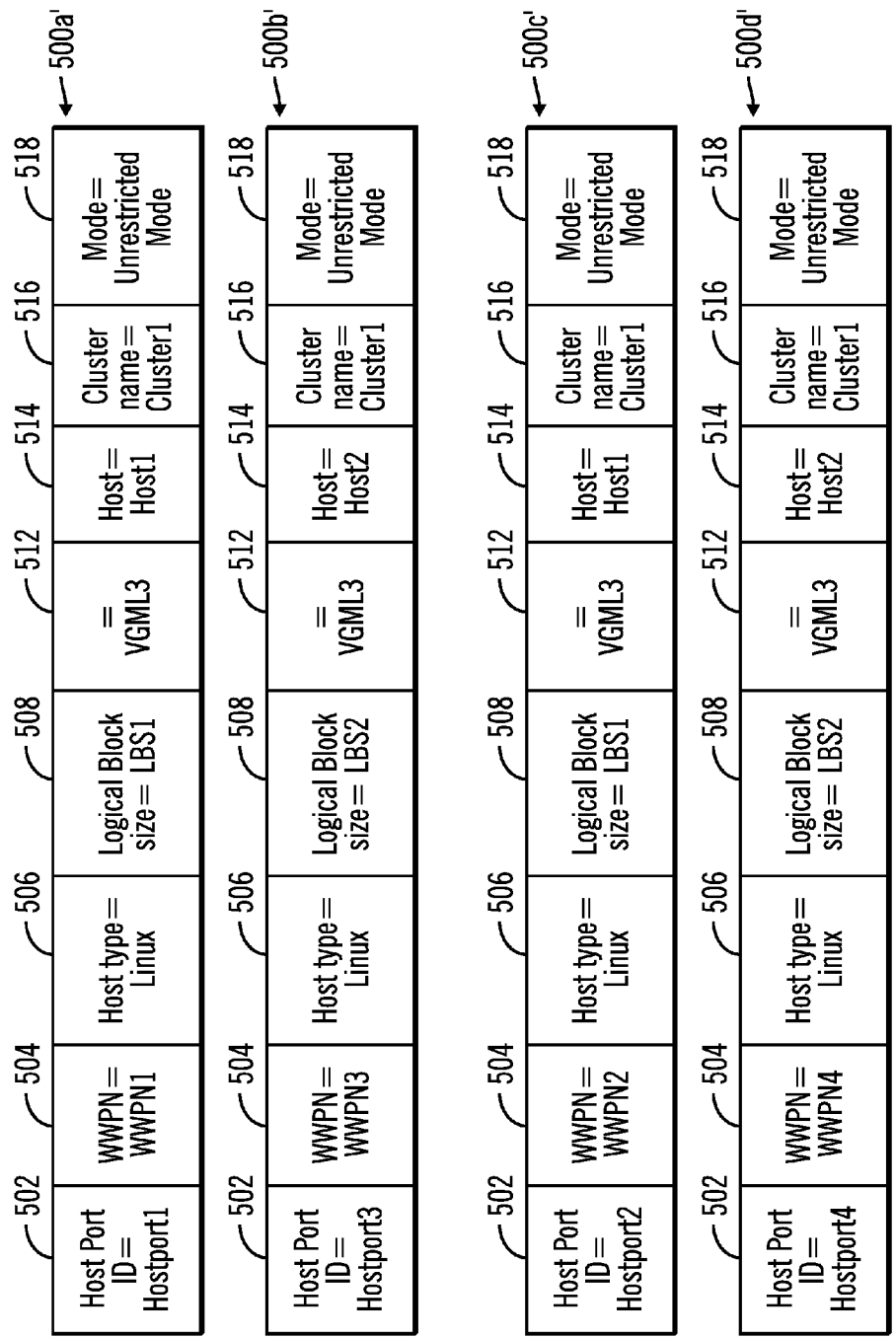

In a similar manner, host host2 is represented by unrestricted use mode system configuration data structures 500b' and 500d' shown in FIG. 5e and are similar to the corresponding data structures depicted as data structures 500b, 500d in the example of FIG. 5d. However, in this example, the host type attribute stored in the field 506 of each of the data structures representing the hosts, host1, host2, are the same, that is, host type is defined as "Linux", in this example, for both hosts, host1, host2. In addition, in this example, at the operational point represented by block 376, attribute fields 512, 516 remain undefined. As explained in greater detail below, the attribute fields 512, 516 will later become defined as depicted in FIG. 5e in later operations.

In another operation, the name of the host cluster to be represented and the names of the hosts selected to be grouped under that host cluster name, are inputted (block 378) by the system component management. The name of the host cluster and the names of the hosts to be grouped in the host cluster to be represented may be selected using the GUI page 480 of FIG. 4d, for example. Thus, the host names host1 and host2, for example, may be input by clicking on the associated input button 484a, 484b, for example. The host cluster name, cluster1 in this example may be input (block 378) though a suitable interface such as the text field 486, for example. It is appreciated that a host name or host cluster name may be input using other input techniques.

Upon receipt of the inputted system configuration data for representing the host cluster, the multiple mode data structures representing the selected hosts, may be updated (block 382) to represent the added host cluster representation. They may be updated automatically in response to the user's host name and host cluster name inputs or may be updated in response to receipt of an update instruction triggered by the user clicking on an "UPDATE CLUSTER LIST" input button 488, for example.

FIG. 5e shows one example of the multiple mode data structures 500a'-500d' of the selected hosts after being updated with the selected host cluster name. Accordingly, the host cluster name attribute field 516 has been updated in each of the multiple mode data structures 500a'-500d' representing the selected hosts, host1 and host2, to define the name of the host cluster, cluster1 in this example, to which the hosts, host1 and host2 have been grouped.

Accordingly, following the updating of the field 516 depicted in FIG. 5e, the host cluster, cluster1, is represented by the multiple mode data structures 500a'-500d', as indicated by the host cluster attribute field 516. As discussed above, the host, host1 continues to be represented by the multiple mode data structures 500a' and 500c', as indicated by the host name attribute field 514 of the data structures 500a' and 500c'. The host, host2 continues to be represented by the multiple mode data structures 500b' and 500d', as indicated by the host name attribute field 514 of the data structures 500b' and 500d'. The host port hostport1 continues to be represented by the data structure 500a' as indicated by the attribute fields 502, 504 of the data structure 500a'. The host port hostport2 continues to be represented by the data structure 500c' as indicated by the attribute fields 502, 504 of the data structure 500c'. The host port hostport3 continues to be represented by the data structure 500b' as indicated by the attribute fields 502, 504 of the data structure 500b'. The host port hostport4 continues to be represented by the data structure 500d' as indicated by the attribute fields 502, 504 of the data structure 500d'.

In the embodiment, of FIG. 5e, the host name attribute fields 514 were defined prior to the host cluster name attribute fields 516 being defined. It is appreciated that in other embodiments, the host cluster name attribute fields 516 may be defined before the host name attribute fields 514. Moreover, in the embodiment, of FIG. 5e, the host port name attribute fields 502, 504 were defined prior to the host cluster name attribute fields 516 being defined. However, it is appreciated that in other embodiments, the host cluster name attribute fields 516 may be defined before the host port name attribute fields 502, 504 are defined. If so, any such multiple mode data structures obtained (block 376, FIG. 3d) would be restricted use mode data structures until the host port attribute fields are defined. If no currently existing data structures are obtained (block 376, FIG. 3d), a multiple mode data structure may be created in a manner similar to that described above for a host, to represent the host cluster representation to be added.

FIG. 3c is also directed to operations of a host management module 26d (FIG. 1a), that is, mapping volume groups to host clusters such as the host cluster, cluster1, in this example, using the volume group data structures and multiple mode data structures described above and maintained by the system component management 26. In one operation, an instruction is received (block 342, FIG. 3c) to create a representation of a mapping of a volume group to a host cluster in this example. In one embodiment, the instruction may be received from a user through an interface such as a graphical user interface (GUI) of the system component management 26 (FIG. 1a). It is appreciated that a create mapping representation instruction may be provided by other sources, such as auto-generation, for example.

FIG. 4c shows an example of a GUI page or window 452 of the host management module 26c (FIG. 1a) displayed by a display 408 (FIG. 4a) of the computing system of FIG. 1a, for example. In this example, a user may provide an instruction to the system component management of the storage system management to create a representation of a mapping as described above in connection with hosts, by clicking on a user input button 456 labeled with the informational text "ADD MAPPING." It is appreciated that other types of GUI elements may be utilized, depending upon the particular application.

In response to receipt (block 342, FIG. 3c) of the instruction to create a representation of a mapping, the data structures created or otherwise obtained and populated to represent the hosts, host clusters and volume groups added to the system are obtained (block 346). Accordingly, in this example, the multiple mode system configuration data structures 500a'-500d' (FIG. 5e) representing the hosts, host1 and host2 are obtained and the volume group data structures 600a-600d (FIG. 6b) representing the volume groups, volumegroup1-volumegroup4, are obtained.

In this example, a user may use the interface 452 to select a host cluster such as hostcluster1 for the mapping by clicking on an input button 458 bearing an appropriate information label such as "Hostcluster1" which was defined as described above, for the name or names of the host clusters from which the host cluster of the mapping may be selected. Similarly, a user may select one or more volume groups such as Volumegroup1, Volumegroup2, Volumegroup3 or Volumegroup4 for the mapping by clicking on an input button 462a, or 462b, 462c, or 462d, bearing an appropriate information label such as "Volumegroup1," "Volumegroup2," "Volumegroup3" or "Volumegroup4" respectively, for the names of the volume groups from which the volume group or groups may be selected.

The host cluster and volume group or groups selected for the mapping may be input (block 350, FIG. 3c) and a determination made as to whether the selected host cluster and volume group or groups are compatible. In one example, the user may select volume groups volumegroup1-volumegroup4 to be mapped to the host cluster, hostcluster1. In this example, as indicated by the volume group data structures 600a'-600d' (FIG. 6c) representing the volume groups, volumegroup1-volumegroup4, respectively, and the multiple mode data structures 500a', 500c' (FIG. 5c) representing the host, host1, and the multiple mode data structures 500b', 500c' (FIG. 5c) representing the host, host2, the host types are defined as the same, that is, host type Linux in this example, and therefore may be deemed (block 354, FIG. 3c) to be compatible.

Accordingly, the volume group mappings attribute for the data structures for the selected host cluster, hostcluster1 in this example, may be updated (block 358) to indicate the list of volume groups which have been mapped to the selected host cluster. FIG. 5e shows the list of volume group mappings attribute field 512 of the multiple mode data structures 500a', 500c' representing the selected host, host1, as updated to define the list of volume group mappings attribute as the value VGML3 which in this example, is a list comprising volume groups volumegroup1-volumegroup4 have been mapped to the host, host1 of the selected host cluster hostcluster1. Similarly, FIG. 5e shows the list of volume group mappings attribute field 512 of the multiple mode data structures 500b', 500d' representing the host, host2, of the selected host cluster hostcluster1 as updated to define the list of volume group mappings attribute as again, the value VGML3 which in this example, is a list comprising volume groups volumegroup1-volumegroup4 which have been mapped to both of the hosts, host1 and host2 of the selected host cluster hostcluster1.

Figure 6C:
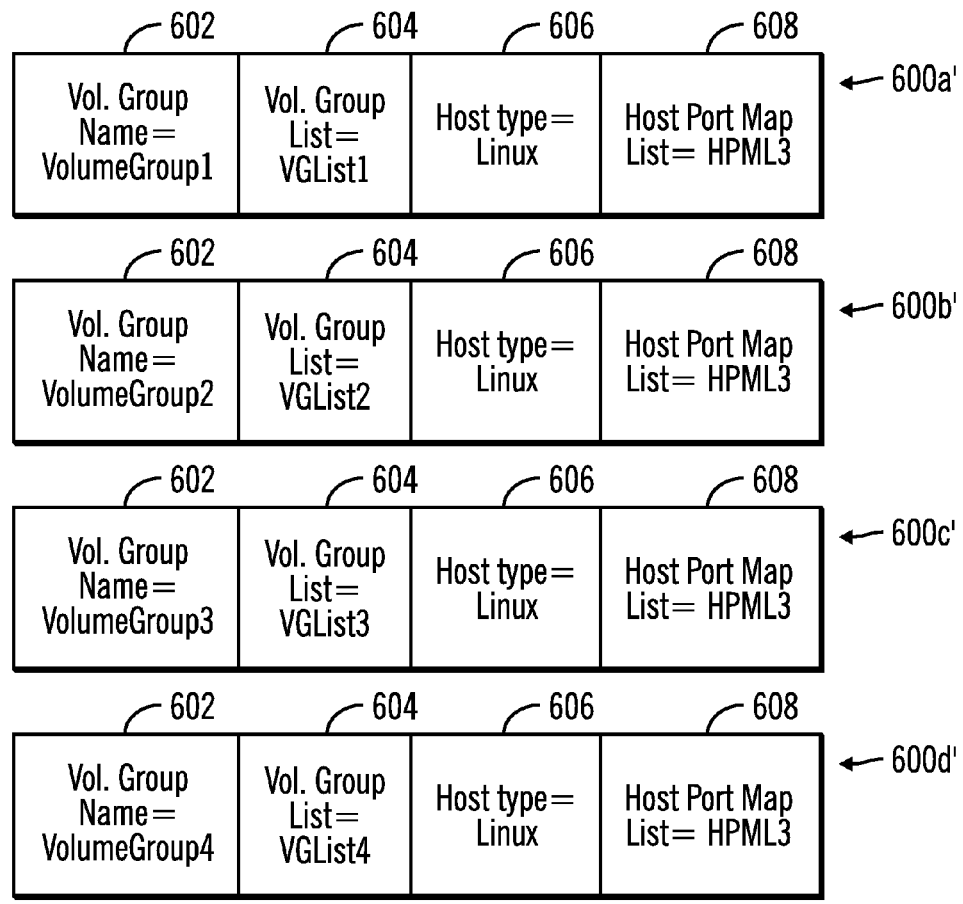

In addition, the host port mapping list attribute, for the data structures for the selected volume groups, volumegroup1-volumegroup4 in this example, may be updated (block 362) to indicate the list of host ports which have been mapped to the selected volume groups. FIG. 6c shows the host port map list attribute field 608 of the volume group data structures 600a'-600d' representing the selected volume groups, volumegroup1-volumegroup4, respectively, as updated to define the host port map list attribute as the value HPML3 which in this example, is a list comprising host ports, hostport1 and hostport2, which were previously assigned to the host, host1 of the selected host cluster hostcluster1 as indicated by the multiple mode data structures 500a', 500c', respectively, (FIG. 5e) representing the host, host1, of the selected host cluster hostcluster1 as discussed above. The value HPML3 in this example, for the host port map list further comprises host ports, hostport3 and hostport4, which were previously assigned to the host, host2 of the selected host cluster hostcluster1 as indicated by the multiple mode data structures 500b', 500d', respectively, (FIG. 5e) representing the host, host2, of the selected host cluster hostcluster1 as discussed above. Thus, the system component management system may determine the value HPML3 listing the host ports, hostport1-hostport4, mapped to the selected volume groups, volumegroup1-volumegroup4, by examining the host ports identified by the multiple mode data structures, data structures 500a'-500d' in this example, representing the hosts of the host cluster hostcluster1 in this example, selected for the mapping to the selected volume groups, volumegroup1-volumegroup4, in this example.

It is seen from the above, in one aspect of the present description, multiple mode data structures are provided which are fully compatible with a later generation storage management system which manage representations of hosts and host clusters in addition to representations of host ports, for example. Moreover, the multiple mode data structures in accordance with the present description, may increase the efficiency of modifying existing programming to support features of the later generation storage management system. For example, a multiple mode data structure in accordance with the present description can be utilized to provide a host representation role in one mode, and represent both a host and a host port in another mode. Although the multiple mode host port data structures are fully compatible with a later generation storage management system, the multiple mode host port data structures of the present description may increase the amount of existing programming code suitable for adaptation to the later generation storage management system, while reducing the amount of revisions to existing programming code for adaptation to the later generation of storage management system. Other features and advantages may be realized, depending upon the particular application.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
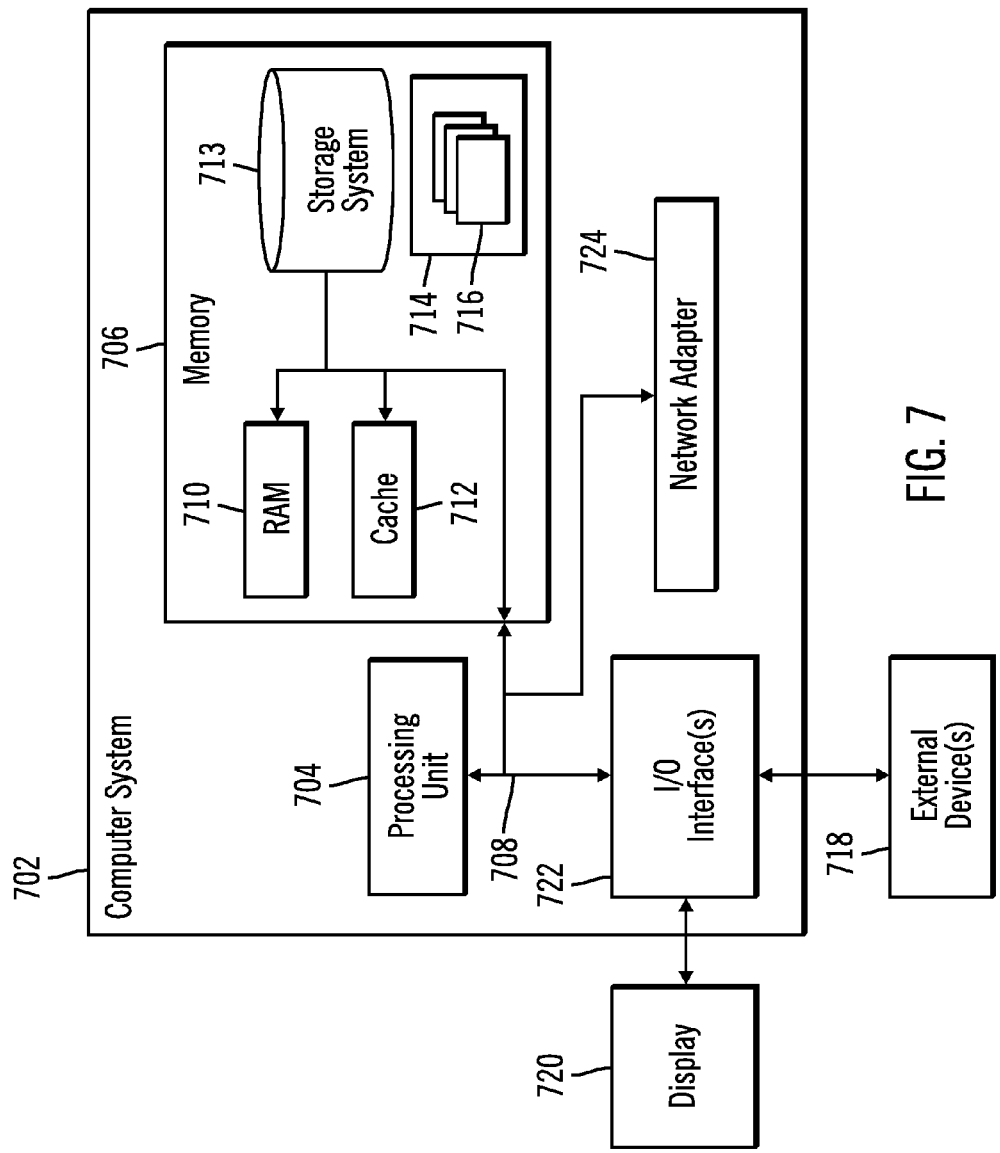
FIG. 7 illustrates a computing environment in which components of FIG. 1a may be implemented.

The computational components of FIG. 1a, including the hosts and storage server 42 may be implemented in one or more computer systems, such as the computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1a may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The reference characters used herein, such as i and n, are used herein to denote a variable number of instances of an element, which may represent the same or different values, and may represent the same or different value when used with different or the same elements in different described instances.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for providing a storage management system to manage host ports and storage volumes in a computing system having a storage controller and a storage unit controlled by the storage controller and containing storage volumes, wherein the computer program product comprises a computer readable storage medium having program instructions embodied therewith, the program instructions executable by a processor of the storage management system to cause operations, the operations comprising:

maintaining volume data structures, each volume data structure representing one of a storage volume and a group of storage volumes in a storage unit;

maintaining multiple mode data structures, each multiple mode data structure configured to be used by the storage management system in one of a first mode and a second mode, and further configured to store attribute data including a host port name attribute for defining the name of a host port to be represented by the multiple mode data structure and including a host name attribute of a host for defining the name of a host to be represented by the multiple mode data structure wherein a host port represented by a multiple mode data structure is assigned to the host port represented by the same multiple mode data structure; and using a first multiple mode data structure having in a first mode, an undefined host port name attribute and a defined host name attribute to represent a first host identified by the defined host name attribute of the first multiple mode data structure in the first mode.

2. The computer program product of claim 1, wherein each said multiple mode data structure is further configured to store a mode attribute to indicate when defined, the mode of use of the multiple mode data structure by the storage management system, the operations further comprising restricting use of the first multiple mode data structure in said first mode in response to said mode attribute being defined to indicate said first mode, so that said first multiple mode data structure is restricted from representing a host port in the storage management system when said host port name attribute is undefined.

3. The computer program product of claim 2, wherein the operations further comprise permitting use of the first multiple mode data structure in said second mode in response to said mode attribute being defined to indicate said second mode, so that said first multiple mode data structure is permitted to represent a host port in the storage management system when said host port name attribute is defined.

4. The computer program product of claim 3, wherein the operations further comprise creating a representation of said first host in said storage management system, said creating including:
receiving as a user input, a first host name of said first host;
creating said first multiple mode data structure; and
defining said host name attribute of said first multiple mode data structure to identify said first host as said first host name inputted by the user while said host port name attribute of said first multiple mode data structure remains undefined.

5. The computer program product of claim 4, wherein said creating further includes defining said mode attribute of said first multiple mode data structure having an undefined host port name attribute to indicate said first mode so that said first multiple mode data structure is restricted from representing a host port.

6. The computer program product of claim 5, wherein each said multiple mode data structure is further configured to store a defined host type attribute of a host to which the host port identified by a defined host port name attribute, is assigned, and wherein said creating further includes:
receiving as a user input, a host type of said first host; and
defining said host type attribute of said first multiple mode data structure as said host type inputted by the user while said host port name attribute of said first multiple mode data structure remains undefined.

7. The computer program product of claim 6, wherein the operations further comprise creating a representation of a first host port of said first host in said storage management system, said host port representation creating including:
receiving as a user input, a first host port name;
defining said host port name attribute of said first multiple mode data structure as said first host port name inputted by the user so that said host port name attribute of said first multiple mode data structure becomes defined as said first host port name; and
redefining said mode attribute of said first multiple mode data structure to indicate said second mode while said host port name attribute of said first multiple mode data structure remains defined, so that said first multiple mode data structure is permitted to represent a host port having said first host port name inputted by the user.

8. The computer program product of claim 7 wherein each said multiple mode data structure is further configured to store a mapping attribute which when defined, identifies a volume group mapped to the host and host port identified by the defined host name attribute and host port name attribute, respectively, of the multiple mode data structure, the operations further comprise:
receiving as a user input, selection of said first host and a first volume group to be mapped to said first host wherein said first host is represented by said first multiple mode data structure in said second mode; and
mapping said selected volume group to said selected first host, said mapping including defining said mapping attribute of said first multiple mode data structure to identify said mapping of said selected volume group to said selected first host.

9. The computer program product of claim 8 wherein each said multiple mode data structure is further configured to store a host cluster name attribute which when defined, identifies a host cluster, and wherein said mapping attribute when defined, identifies a volume group mapped to the host cluster, host and host port identified by a defined host cluster name attribute, defined host name attribute and defined host port name attribute of the multiple mode data structure, and wherein the operations further comprise:
creating a representation of a first host cluster in said storage management system, said host cluster representation creating including:
receiving as a user input, a first host cluster name of a first host cluster which includes the first host as a member of the first host cluster; and
defining a host cluster name attribute of said first multiple mode data structure as said first host cluster name inputted by the user wherein said first host cluster is represented by said first multiple mode data structure in which said mode attribute is defined to indicate said second mode so that said first multiple mode data structure is permitted to represent said first host port; and
receiving as a user input, selection of said first host cluster and a first volume group to be mapped to said first host cluster; and
mapping said selected volume group to said selected first host cluster, said mapping including defining said mapping attribute of said first multiple mode data structure to identify said selected volume group as mapped to said first host cluster.

10. A system for use with a host and at least one storage unit storage volumes configurable as volume groups, comprising:
a server configurable to control the at least one storage unit and having at least one processor, a memory configurable to store data structures, and a plurality of host ports configurable for coupling the server to a host; and a storage management system configurable to manage host ports and storage volumes; wherein the storage management system comprises a processor of the server and a computer program product for the storage management system to manage host ports and storage volumes, wherein the computer program product comprises a computer readable storage medium having program instructions embodied therewith, the program instructions executable by a processor of the storage management system to cause operations, the operations comprising:
maintaining volume data structures in the memory, each volume data structure representing one of a storage volume and a group of storage volumes in a storage unit;
maintaining multiple mode data structures in the memory, each multiple mode data structure configured to be used by the storage management system in one of a first mode and a second mode, and further configured to store attribute data including a host port name attribute for defining the name of a host port to be represented by the multiple mode data structure and including a host name attribute of a host for defining the name of a host to be represented by the multiple mode data structure wherein a host port represented by a multiple mode data structure is assigned to the host port represented by the same multiple mode data structure; and using a first multiple mode data structure having in a first mode, an undefined host port name attribute and a defined host name attribute to represent a first host identified by the defined host name attribute of the first multiple mode data structure in the first mode.

11. The system of claim 10, wherein each said multiple mode data structure is further configured to store a mode attribute to indicate when defined, the mode of use of the multiple mode data structure by the storage management system, the operations further comprising restricting use of the first multiple mode data structure in said first mode in response to said mode attribute being defined to indicate said first mode, so that said first multiple mode data structure is restricted from representing a host port in the storage management system when said host port name attribute is undefined.

12. The system of claim 11, wherein the operations further comprise permitting use of the first multiple mode data structure in said second mode in response to said mode attribute being defined to indicate said second mode, so that said first multiple mode data structure is permitted to represent a host port in the storage management system when said host port name attribute is defined.

13. The system of claim 12, wherein the operations further comprise creating a representation of said first host in said storage management system, said creating including:

receiving as a user input, a first host name of said first host;

creating said first multiple mode data structure; and defining said host name attribute of said first multiple mode data structure to identify said first host as said first host name inputted by the user while said host port name attribute of said first multiple mode data structure remains undefined.

14. The system of claim 13, wherein said creating further includes defining said mode attribute of said first multiple mode data structure having an undefined host port name attribute to indicate said first mode so that said first multiple mode data structure is restricted from representing a host port.

15. The system of claim 14, wherein each said multiple mode data structure is further configured to store a defined host type attribute of a host to which the host port identified by a defined host port name attribute, is assigned, and wherein said creating further includes:

receiving as a user input, a host type of said first host; and defining said host type attribute of said first multiple mode data structure as said host type inputted by the user while said host port name attribute of said first multiple mode data structure remains undefined.

16. The system of claim 15, wherein the operations further comprise creating a representation of a first host port of said first host in said storage management system, said host port representation creating including:

receiving as a user input, a first host port name;

defining said host port name attribute of said first multiple mode data structure as said first host port name inputted by the user so that said host port name attribute of said first multiple mode data structure becomes defined as said first host port name; and redefining said mode attribute of said first multiple mode data structure to indicate said second mode while said host port name attribute of said first multiple mode data structure remains defined, so that said first multiple mode data structure is permitted to represent a host port having said first host port name inputted by the user.

17. The system of claim 16 wherein each said multiple mode data structure is further configured to store a mapping attribute which when defined, identifies a volume group mapped to the host and host port identified by the defined host name attribute and host port name attribute, respectively, of the multiple mode data structure, the operations further comprise:

receiving as a user input, selection of said first host and a first volume group to be mapped to said first host wherein said first host is represented by said first multiple mode data structure in which said second mode; and mapping said selected volume group to said selected first host, said mapping including defining said mapping attribute of said first multiple mode data structure to identify said mapping of said selected volume group to said selected first host.

18. The system of claim 17 further for use with a host cluster of hosts, wherein each said multiple mode data structure is further configured to store a host cluster name attribute which when defined, identifies a host cluster, and wherein said mapping attribute when defined, identifies a volume group mapped to the host cluster, host and host port identified by a defined host cluster name attribute, defined host name attribute and defined host port name attribute of the multiple mode data structure, and wherein the operations further comprise:

creating a representation of a first host cluster in said storage management system, said host cluster representation creating including:

receiving as a user input, a first host cluster name of a first host cluster which includes the first host as a member of the first host cluster; and defining a host cluster name attribute of said first multiple mode data structure as said first host cluster name inputted by the user wherein said first host cluster is represented by said first multiple mode data structure in which said mode attribute is defined to indicate said second mode so that said first multiple mode data structure is permitted to represent said first host port; and receiving as a user input, selection of said first host cluster and a first volume group to be mapped to said first host cluster; and mapping said selected volume group to said selected first host cluster, said mapping including defining said mapping attribute of said first multiple mode data structure to identify said selected volume group as mapped to said first host cluster.

19. A method, comprising:

operations of a storage management system for managing host ports and storage volumes in a computing system having a storage controller and a storage unit controlled by the storage controller and containing storage volumes, wherein a computer readable storage medium of the storage management system has program instructions embodied therewith and executable by a processor of the storage management system to cause the operations, the operations comprising:

maintaining volume data structures in a memory, each volume data structure representing one of a storage volume and a group of storage volumes in a storage unit;

maintaining multiple mode data structures in a memory, each multiple mode data structure configured to be used by a storage management system in one of a first mode and a second mode, and further configured to store attribute data including a host port name attribute for defining the name of a host port to be represented by the multiple mode data structure and including a host name attribute of a host for defining the name of a host to be represented by the multiple mode data structure wherein a host port represented by a multiple mode data structure is assigned to the host port represented by the same multiple mode data structure; and using a first multiple mode data structure having in a first mode, an undefined host port name attribute and a defined host name attribute to represent a first host identified by the defined host name attribute of the first multiple mode data structure in the first mode.

20. The method of claim 19, wherein each said multiple mode data structure is further configured to store a mode attribute to indicate when defined, the mode of use of the multiple mode data structure by the storage management system, the operations further comprising restricting use of the first multiple mode data structure in said first mode in response to said mode attribute being defined to indicate said first mode, so that said first multiple mode data structure is restricted from representing a host port in the storage management system when said host port name attribute is undefined.

21. The method of claim 20, wherein the operations further comprise permitting use of the first multiple mode data structure in said second mode in response to said mode attribute being defined to indicate said second mode, so that said first multiple mode data structure is permitted to represent a host port in the storage management system when said host port name attribute is defined.

22. The method of claim 21, wherein the operations further comprise creating a representation of said first host in said storage management system, said creating including:

receiving as a user input, a first host name of said first host;

creating said first multiple mode data structure; and defining said host name attribute of said first multiple mode data structure to identify said first host as said first host name inputted by the user while said host port name attribute of said first multiple mode data structure remains undefined.

23. The method of claim 22, wherein said creating further includes defining said mode attribute of said first multiple mode data structure having an undefined host port name attribute to indicate said first mode so that said first multiple mode data structure is restricted from representing a host port.

24. The method of claim 23, wherein each said multiple mode data structure is further configured to store a defined host type attribute of a host to which the host port identified by a defined host port name attribute, is assigned, and wherein said creating further includes:

receiving as a user input, a host type of said first host; and defining said host type attribute of said first multiple mode data structure as said host type inputted by the user while said host port name attribute of said first multiple mode data structure remains undefined.

25. The method of claim 24, wherein the operations further comprise creating a representation of a first host port of said first host in said storage management system, said host port representation creating including:

receiving as a user input, a first host port name;

defining said host port name attribute of said first multiple mode data structure as said first host port name inputted by the user so that said host port name attribute of said first multiple mode data structure becomes defined as said first host port name; and redefining said mode attribute of said first multiple mode data structure to indicate said second mode while said host port name attribute of said first multiple mode data structure remains defined, so that said first multiple mode data structure is permitted to represent a host port having said first host port name inputted by the user.

26. The method of claim 25 wherein each said multiple mode data structure is further configured to store a mapping attribute which when defined, identifies a volume group mapped to the host and host port identified by the defined host name attribute and host port name attribute, respectively, of the multiple mode data structure, the operations further comprise:

receiving as a user input, selection of said first host and a first volume group to be mapped to said first host wherein said first host is represented by said first multiple mode data structure in which said second mode; and mapping said selected volume group to said selected first host, said mapping including defining said mapping attribute of said first multiple mode data structure to identify said mapping of said selected volume group to said selected first host.

27. The method of claim 26 wherein each said multiple mode data structure is further configured to store a host cluster name attribute which when defined, identifies a host cluster, and wherein said mapping attribute when defined, identifies a volume group mapped to the host cluster, host and host port identified by a defined host cluster name attribute, defined host name attribute and defined host port name attribute of the multiple mode data structure, and wherein the operations further comprise:

creating a representation of a first host cluster in said storage management system, said host cluster representation creating including:

receiving as a user input, a first host cluster name of a first host cluster which includes the first host as a member of the first host cluster; and defining a host cluster name attribute of said first multiple mode data structure as said first host cluster name inputted by the user wherein said first host cluster is represented by said first multiple mode data structure in which said mode attribute is defined to indicate said second mode so that said first multiple mode data structure is permitted to represent said first host port; and receiving as a user input, selection of said first host cluster and a first volume group to be mapped to said first host cluster; and mapping said selected volume group to said selected first host cluster, said mapping including defining said mapping attribute of said first multiple mode data structure to identify said selected volume group as mapped to said first host cluster.

* * * * *